US009811226B2

(12) United States Patent
Itaya et al.

(10) Patent No.: US 9,811,226 B2
(45) Date of Patent: Nov. 7, 2017

(54) SENSOR DEVICE, INPUT DEVICE, AND ELECTRONIC APPARATUS

(71) Applicant: Sony Corporation, Tokyo (JP)

(72) Inventors: Takashi Itaya, Kanagawa (JP); Shogo Shinkai, Kanagawa (JP); Hiroto Kawaguchi, Kanagawa (JP); Fumihiko Iida, Kanagawa (JP); Hayato Hasegawa, Kanagawa (JP); Kei Tsukamoto, Kanagawa (JP); Takayuki Tanaka, Kanagawa (JP); Tomoko Katsuhara, Kanagawa (JP); Tomoaki Suzuki, Kanagawa (JP); Taizo Nishimura, Kanagawa (JP); Hiroshi Mizuno, Kanagawa (JP); Yasuyuki Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/914,405

(22) PCT Filed: Aug. 22, 2014

(86) PCT No.: PCT/JP2014/004330
§ 371 (c)(1),
(2) Date: Feb. 25, 2016

(87) PCT Pub. No.: WO2015/037197
PCT Pub. Date: Mar. 19, 2015

(65) Prior Publication Data
US 2016/0202800 A1    Jul. 14, 2016

(30) Foreign Application Priority Data

Sep. 10, 2013 (JP) ................. 2013-187049

(51) Int. Cl.
*G06F 3/044* (2006.01)
*G06F 3/0488* (2013.01)
(Continued)

(52) U.S. Cl.
CPC .............. *G06F 3/044* (2013.01); *G06F 3/047* (2013.01); *G06F 3/0414* (2013.01); *G06F 2203/04102* (2013.01)

(58) Field of Classification Search
CPC ......... G06F 3/044; G06F 3/045; G06F 3/0488
See application file for complete search history.

(56) References Cited

U.S. PATENT DOCUMENTS 4,687,885 A * 8/1987 Talmage, Jr. ........... G06F 3/045
178/18.05
5,561,326 A   10/1996 Ito et al.
(Continued)

FOREIGN PATENT DOCUMENTS

| EP | 2 544 081 A2 | 1/2013 |
| JP | 63-121219 A | 5/1988 |

(Continued)

OTHER PUBLICATIONS

European Office Action dated Jan. 11, 2017 in connection with European Application No. 14759066.5.

*Primary Examiner* — Ricardo L Osorio
(74) *Attorney, Agent, or Firm* — Wolf, Greenfield & Sacks, P.C.

(57) ABSTRACT

There is provided a sensor device that includes a flexible first conductor layer and an electrode substrate. The electrode substrate includes a plurality of first electrode wires, a plurality of second electrode wires, capacity sensors being formed at capacitively coupled portions of the first and second electrode wires, and a flexible substrate that supports the first and second electrode wires. The sensor device also (Continued)

includes a first supporting body including a plurality of first structures that connect the first conductor layer and the electrode substrate.

16 Claims, 16 Drawing Sheets

(51) Int. Cl.
*G06F 3/041* (2006.01)
*G06F 3/047* (2006.01)

(56) References Cited

U.S. PATENT DOCUMENTS

| | | | |
|---|---|---|---|
| 5,815,141 A * | 9/1998 | Phares | G06F 3/045 178/18.05 |
| 6,094,981 A | 8/2000 | Hochstein | |
| 6,708,564 B2 | 3/2004 | Ishikawa et al. | |
| 6,979,873 B2 | 12/2005 | Fujii | |
| 7,249,509 B2 | 7/2007 | Hirano | |
| 7,513,154 B2 | 4/2009 | Ino | |
| 7,603,903 B2 | 10/2009 | Ohta | |
| 8,063,886 B2 | 11/2011 | Serban et al. | |
| 8,225,660 B2 | 7/2012 | Sakai et al. | |
| 8,256,288 B2 | 9/2012 | Matsunaga | |
| 8,826,734 B2 | 9/2014 | Ohkoshi et al. | |
| 8,913,031 B2 | 12/2014 | Honda et al. | |
| 9,310,200 B2 | 4/2016 | Kabasawa et al. | |
| 9,664,947 B2 | 5/2017 | Kawaura | |
| 2003/0127308 A1 | 7/2003 | Chen et al. | |
| 2003/0154787 A1 | 8/2003 | Yoshiuchi et al. | |
| 2004/0096594 A1 * | 5/2004 | Takeuchi | G02B 5/3083 428/1.2 |
| 2005/0217373 A1 | 10/2005 | Ishikawa et al. | |
| 2006/0147701 A1 * | 7/2006 | Lockridge | G06F 3/045 428/323 |
| 2007/0044557 A1 | 3/2007 | Takemasa et al. | |
| 2007/0229464 A1 | 10/2007 | Hotelling et al. | |
| 2008/0180585 A1 | 7/2008 | Kubota et al. | |
| 2008/0202251 A1 | 8/2008 | Serban et al. | |
| 2009/0122026 A1 * | 5/2009 | Oh | G06F 1/1613 345/174 |
| 2009/0135162 A1 | 5/2009 | Van De Wijdeven et al. | |
| 2009/0256825 A1 | 10/2009 | Klinghult et al. | |
| 2010/0026659 A1 | 2/2010 | Long et al. | |
| 2010/0307242 A1 | 12/2010 | Sakai et al. | |
| 2011/0069036 A1 | 3/2011 | Anno | |
| 2011/0074728 A1 | 3/2011 | Liu | |
| 2011/0090175 A1 | 4/2011 | Mamba et al. | |
| 2011/0115738 A1 | 5/2011 | Suzuki et al. | |
| 2011/0175845 A1 | 7/2011 | Honda et al. | |
| 2011/0181548 A1 | 7/2011 | Sekiguchi | |
| 2011/0212661 A1 * | 9/2011 | Lee | G06F 3/044 445/24 |
| 2011/0240989 A1 | 10/2011 | Sekine et al. | |
| 2012/0038583 A1 | 2/2012 | Westhues et al. | |
| 2012/0070614 A1 | 3/2012 | Takahashi et al. | |
| 2012/0086666 A1 | 4/2012 | Badaye et al. | |
| 2012/0098783 A1 | 4/2012 | Badaye et al. | |
| 2012/0113071 A1 | 5/2012 | Kawaguchi et al. | |
| 2012/0169625 A1 | 7/2012 | Fan et al. | |
| 2012/0218221 A1 | 8/2012 | Igeta | |
| 2012/0235953 A1 | 9/2012 | Kim et al. | |
| 2012/0298497 A1 * | 11/2012 | Maeda | C09J 133/064 200/600 |
| 2013/0033450 A1 | 2/2013 | Coulson et al. | |
| 2013/0076994 A1 | 3/2013 | Kawaura | |
| 2013/0234734 A1 | 9/2013 | Iida et al. | |
| 2014/0007682 A1 | 1/2014 | Kabasawa et al. | |
| 2014/0299360 A1 * | 10/2014 | Yoshida | H05K 1/09 174/251 |
| 2015/0270076 A1 | 9/2015 | Katsuhara et al. | |
| 2015/0277626 A1 | 10/2015 | Shinkai et al. | |
| 2015/0280708 A1 | 10/2015 | Goto et al. | |
| 2015/0346839 A1 | 12/2015 | Kawaguchi et al. | |
| 2015/0363023 A1 | 12/2015 | Kawaguchi et al. | |
| 2016/0011691 A1 | 1/2016 | Shinkai et al. | |
| 2016/0023444 A1 * | 1/2016 | Uejukkoku | B32B 7/02 428/141 |
| 2016/0026297 A1 | 1/2016 | Shinkai et al. | |
| 2016/0188039 A1 | 6/2016 | Yoon et al. | |
| 2016/0294388 A1 | 10/2016 | Kawaguchi et al. | |

FOREIGN PATENT DOCUMENTS

| | | |
|---|---|---|
| JP | 03-020832 A | 2/1991 |
| JP | 04-125722 A | 4/1992 |
| JP | 2007-272898 A | 10/2007 |
| JP | 2008-181438 A | 8/2008 |
| JP | 2009-123106 A | 6/2009 |
| JP | 2009-169523 A | 7/2009 |
| JP | 2009-211531 A | 9/2009 |
| JP | 2011-065515 A | 3/2011 |
| JP | 2011-154512 A | 8/2011 |
| JP | 2011-170659 A | 9/2011 |
| JP | 2011-175528 A | 9/2011 |
| JP | 2012-133580 A | 7/2012 |
| JP | 2012-178093 A | 9/2012 |
| JP | 2013-015976 A | 1/2013 |
| JP | 2013-105275 A | 5/2013 |
| WO | WO 97/40482 A1 | 10/1997 |
| WO | WO 2013/132736 A1 | 9/2013 |
| WO | WO 2014/125539 A1 | 8/2014 |

* cited by examiner

[Fig. 11]

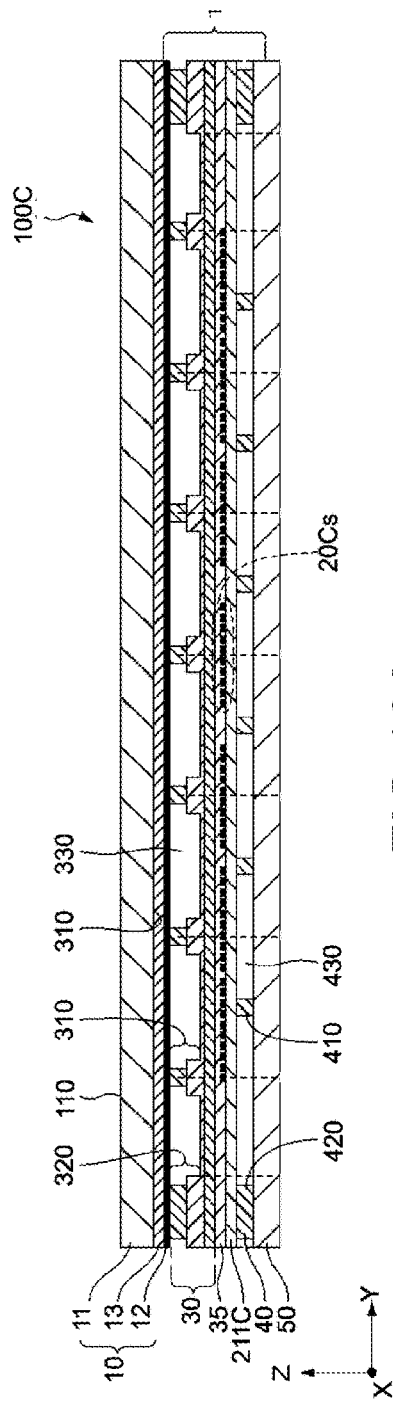
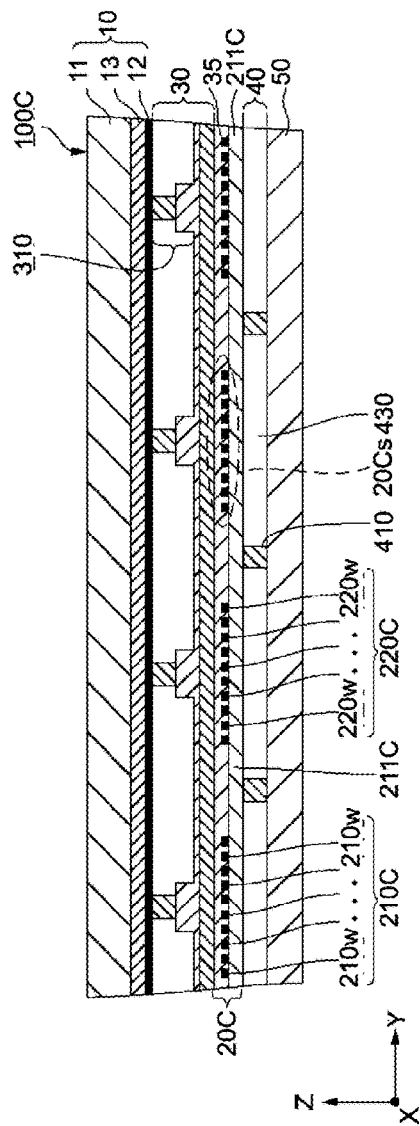
FIG.12A
FIG.12B

[Fig. 16]

SENSOR DEVICE, INPUT DEVICE, AND ELECTRONIC APPARATUS

CROSS REFERENCE TO RELATED APPLICATIONS

This application claims the benefit of Japanese Priority Patent Application JP 2013-187049 filed Sep. 10, 2013, the entire contents of which are incorporated herein by reference.

TECHNICAL FIELD

The present disclosure relates to a sensor device, an input device, and an electronic apparatus that are capable of electrostatically detecting an input operation.

BACKGROUND ART

A sensor device for an electronic apparatus, which includes a capacitive element and is capable of detecting an operation position and a pressing force of an operation element on the input operation surface, for example, has been known (see, for example, Patent Literature 1).

CITATION LIST

Patent Literature

PTL 1: Japanese Patent Application Laid-open No. 2011-170659

SUMMARY

Technical Problem

In recent years, an input method that uses a gesture operation with a finger and has a high degree of freedom has been performed. Moreover, if a pressing force on an operation surface can be reliably detected with high accuracy, various input operations are expected to be performed. In addition, with the thickness reduction of an electronic apparatus in recent years, an input device is expected to be reduced in thickness.

In view of the circumstances as described above, it is desirable to provide a sensor device, an input device, and an electronic apparatus that are capable of reliably detecting a pressing force on an operation surface with high accuracy and are suitable for thickness reduction.

Solution to Problem

In an embodiment, a sensor device includes a sheet-like first conductor layer and an electrode substrate. The electrode substrate includes a plurality of first electrode wires, a plurality of second electrode wires, capacity sensors being formed at paired portions of the first and second electrode wires, and a sheet substrate that supports the first and second electrode wires. The sensor device also includes a first supporting body including a plurality of first structures that connect the first conductor layer and the electrode substrate.

In another embodiment, an input device includes an operating member having an input operation surface, a sheet-like first conductor layer that supports the operating member, and an electrode substrate. The electrode substrate includes a plurality of first electrode wires, a plurality of second electrode wires, capacity sensors being formed at paired portions of the first and second electrode wires, and a sheet substrate that supports the first and second electrode wires. The input device further includes a first supporting body including a plurality of first structures that connect the first conductor layer and the electrode substrate.

In another embodiment, an electronic apparatus includes a display element having an input operation surface, a sheet-like first conductor layer that supports the display element, and an electrode substrate. The electrode substrate includes a plurality of first electrode wires, a plurality of second electrode wires, capacity sensors being formed at paired portions of the first and second electrode wires, and a sheet substrate that supports the first and second electrode wires. The electronic apparatus also includes a first supporting body including a plurality of first structures that connect the first conductor layer and the electrode substrate.

According to an embodiment of the present disclosure, there is provided a sensor device including a first conductor layer, an electrode substrate, and a first supporting body. The first conductor layer is formed to be sheet-like and to be deformable. The electrode substrate includes a plurality of first electrode wires, a plurality of second electrode wires disposed to face the plurality of first electrode wires, capacity sensors being formed in facing areas between the plurality of second electrode wires and the plurality of first electrode wires, respectively, and a single sheet substrate that supports the plurality of first electrode wires and the plurality of second electrode wires. The first supporting body includes a plurality of first structures that connect the first conductor layer and the electrode substrate.

In the sensor device, the relative distance between the first conductor layer and the electrode substrate is changed when the first conductor layer is pressed, and an input operation such as pressing can be electrostatically detected based on the change in the relative distance. Accordingly, it is possible to reliably detecting a pressing force on an operation surface with high accuracy. In addition, because the first electrode wires and the second electrode wires are supported on the single sheet substrate, the electrode substrate can be made thin. Accordingly, it is possible to make the sensor device thin.

The sheet substrate may have a main body and a projecting portion. The main body supports the plurality of first electrode wires and the plurality of second electrode wires. The projecting portion is provided on an edge portion of the main body, projects outward from the edge portion, and supports a plurality of first lead wires and a plurality of second lead wires connected to the plurality of first electrode wires and the plurality of second electrode wires, respectively.

The main body may have a first main surface that supports the plurality of first electrode wires, and a second main surface that supports the plurality of second electrode wires. The projecting portion may have a first surface that supports the plurality of first lead wires, and a second surface that supports the plurality of second lead wires.

The plurality of second lead wires may have a plurality of first wiring portions formed on the second surface, a plurality of second wiring portions formed on the first surface, and a plurality of via portions that connect the plurality of first wiring portions and the plurality of second wiring portions and pass through the projecting portion.

The plurality of first electrode wires and the plurality of second electrode wires may be formed on the same main surface of the main body.

The electrode substrate may further include a connector component mounted on the projecting portion. The connector component may be electrically connected to the plurality of first lead wires and the plurality of second lead wires.

The sensor device may further include a second conductor layer and a second supporting body. The second conductor layer is disposed to face the first conductor layer with the electrode substrate disposed therebetween. The second supporting body includes a plurality of second structures that connect the second conductor layer and the electrode substrate.

According to an embodiment of the present disclosure, there is provided an input device including an operating member, a first conductor layer, an electrode substrate, and a first supporting body. The operating member has an input operation surface. The first conductor layer is formed to be sheet-like, to support the operating member, and to be deformable. The electrode substrate includes a plurality of first electrode wires, a plurality of second electrode wires disposed to face the plurality of first electrode wires, capacity sensors being formed in facing areas between the plurality of second electrode wires and the plurality of first electrode wires, respectively, and a single sheet substrate that supports the plurality of first electrode wires and the plurality of second electrode wires. The first supporting body includes a plurality of first structures that connect the first conductor layer and the electrode substrate.

According to an embodiment of the present disclosure, there is provided an electronic apparatus including a display element, a first conductor layer, an electrode substrate, and a first supporting body. The display element has an input operation surface. The first conductor layer is formed to be sheet-like, to support the display element, and to be deformable. The electrode substrate includes a plurality of first electrode wires, a plurality of second electrode wires disposed to face the plurality of first electrode wires, capacity sensors being formed in facing areas between the plurality of second electrode wires and the plurality of first electrode wires, respectively, and a single sheet substrate that supports the plurality of first electrode wires and the plurality of second electrode wires. The first supporting body includes a plurality of first structures that connect the first conductor layer and the electrode substrate.

Advantageous Effects of Invention

As described above, according to the present disclosure, it is possible to reliably detecting a pressing force on an operation surface with high accuracy and to make a sensor device thin. It should be noted that the effects described here are not necessarily limited, and may be any one of effects described in the present disclosure.

BRIEF DESCRIPTION OF DRAWINGS

FIG. 9 are each a schematic configuration diagram of an electrode substrate according to a comparative example.

FIG. 12A is a schematic cross-sectional view of an input device according to a second embodiment of the present disclosure, and FIG. 12B is a cross-sectional view showing an enlarged main portion of the input device.

DESCRIPTION OF EMBODIMENTS

Hereinafter, embodiments of the present disclosure will be described with reference to the drawings.

First Embodiment

Figure 1:
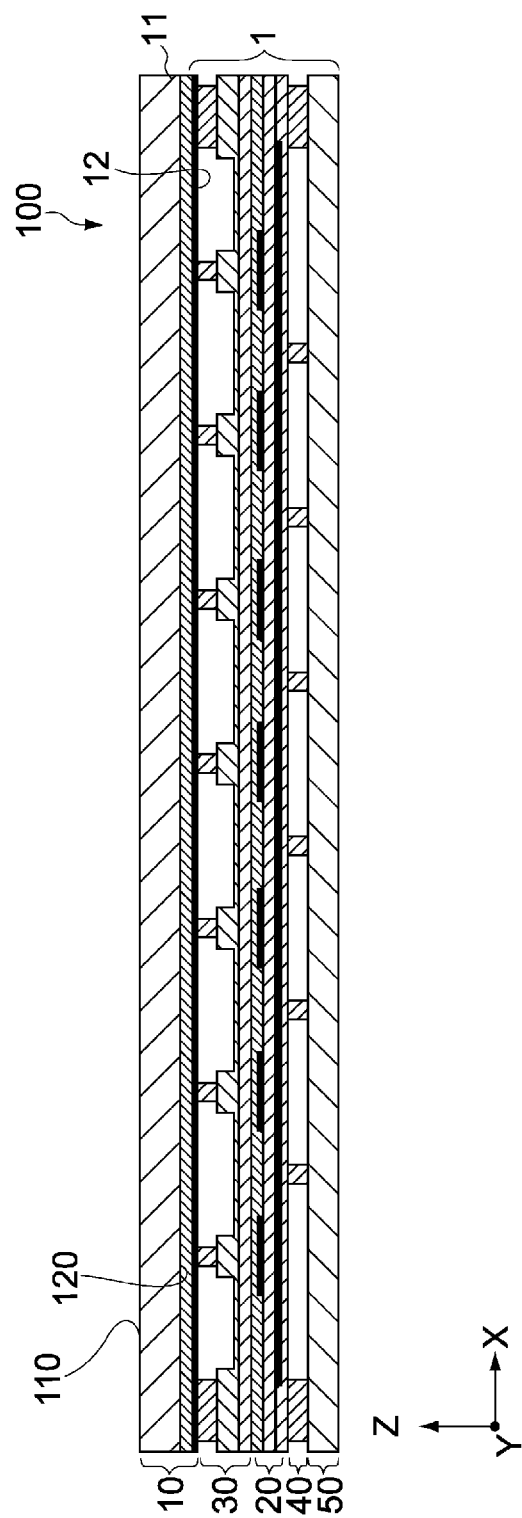
FIG. 1 is a schematic cross-sectional view of an input device according to a first embodiment of the present disclosure.
Figure 2:
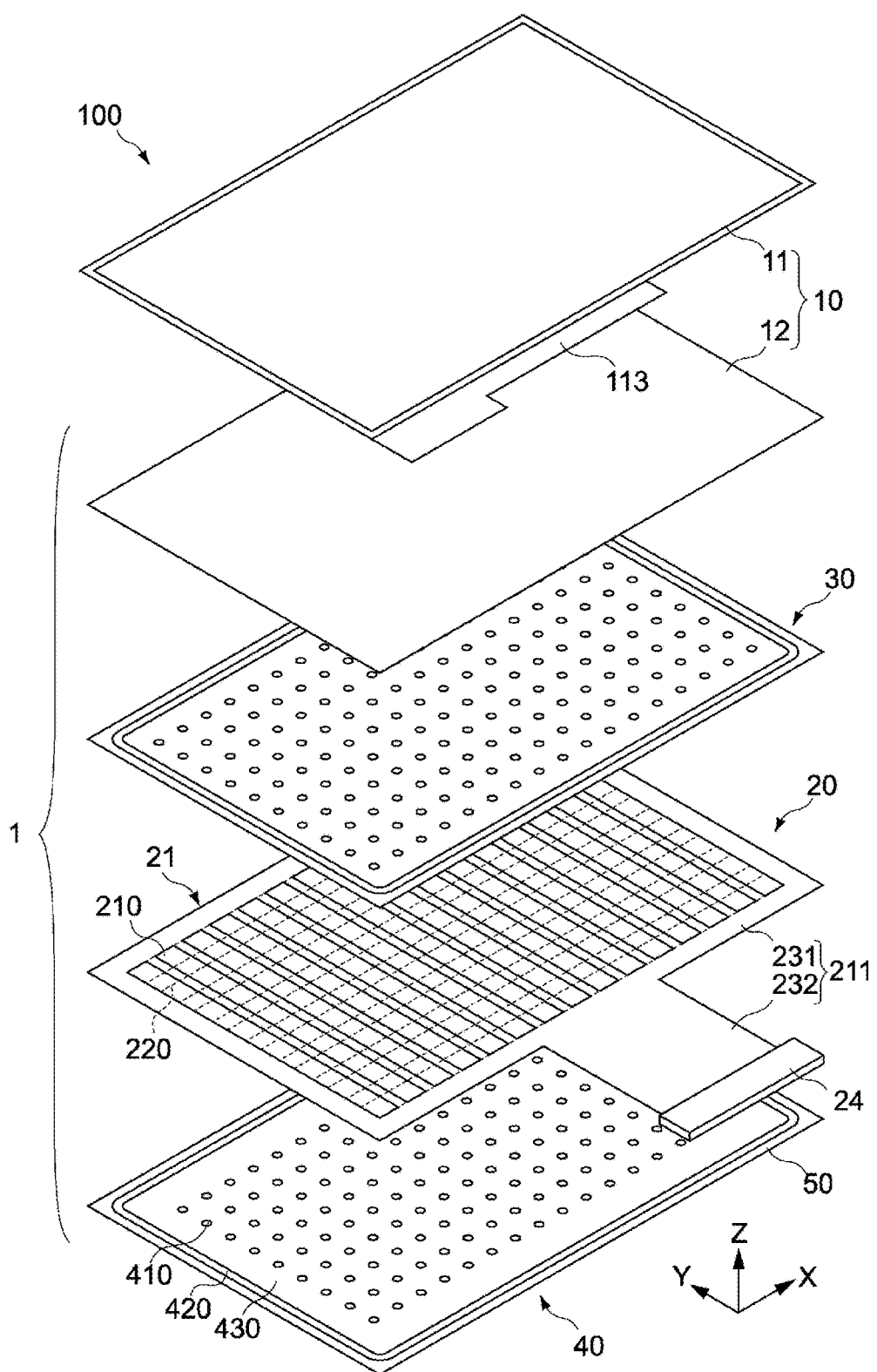
FIG. 2 is an exploded perspective view of the input device.
Figure 3:
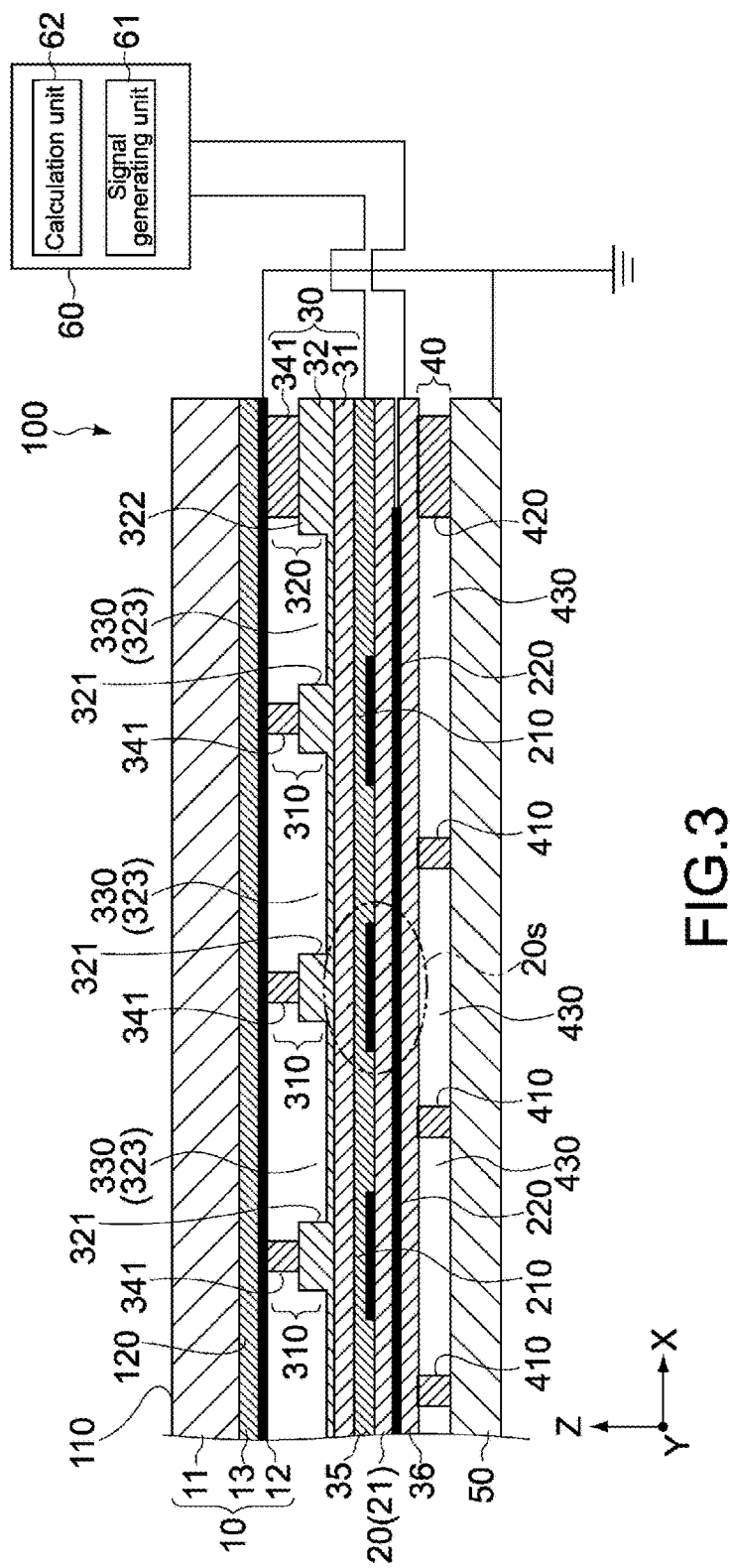
FIG. 3 is a schematic cross-sectional view of a main portion of the input device.
Figure 4:
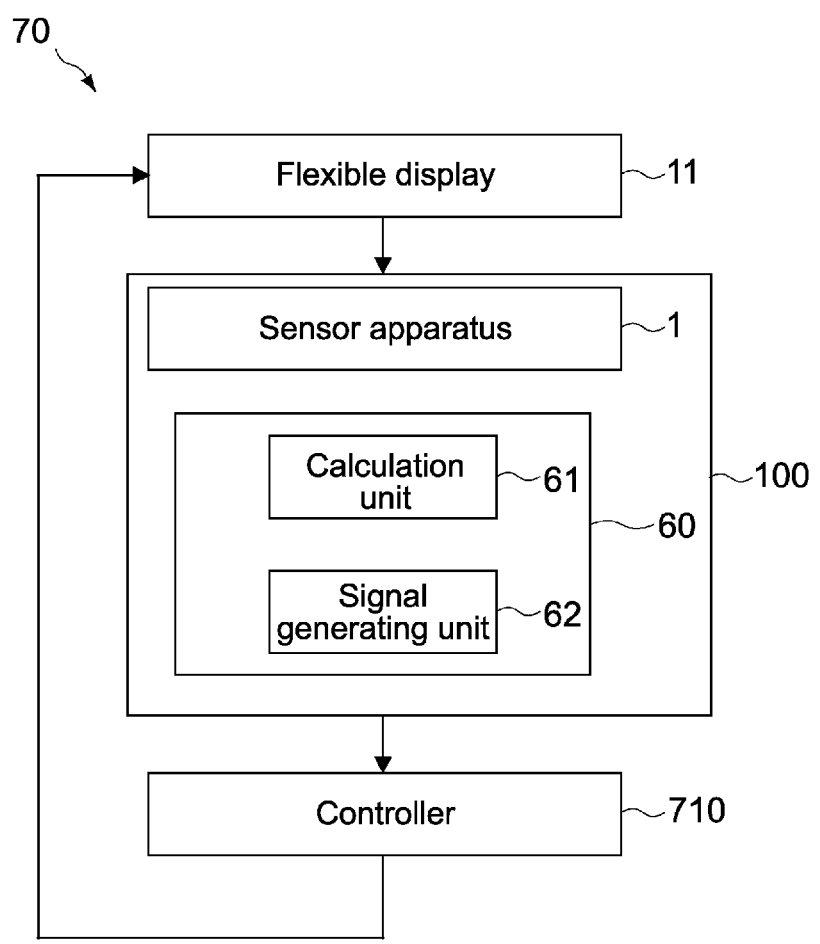
FIG. 4 is a block diagram of an electronic apparatus using the input device.

FIG. 1 is a schematic cross-sectional view of an input device 100 according to a first embodiment of the present disclosure, FIG. 2 is an exploded perspective view of the input device 100, FIG. 3 is a schematic cross-sectional view of a main portion of the input device 100, and FIG. 4 is a block diagram of an electronic apparatus 70 using the input device 100. Hereinafter, the configuration of the input device 100 according to this embodiment will be described. It should be noted that in the figures, an X-axis and a Y-axis represent directions perpendicular to each other (in-plane direction of the input device 100), and a Z-axis represents a direction perpendicular to the X-axis and the Y-axis (thickness direction or vertical direction of the input device 100).

(Input Device)

The input device 100 includes a flexible display (display element) 11 and a sensor device 1. The flexible display 11 receives a user's operation, and the sensor device 1 detects a user's operation. The input device 100 is configured as a flexible touch panel display, for example, and is incorporated into the electronic apparatus 70 to be described later. The sensor device 1 and the flexible display 11 each have a plate-like shape extending in a direction perpendicular to the Z-axis.

The flexible display 11 has an input operation surface 110 and a rear surface 120 opposite to the input operation surface 110. The flexible display 11 has functions as an input operation unit and a display unit in the input device 100. Specifically, the flexible display 11 causes the input operation surface 110 to function as a display surface, and displays an image on the input operation surface 110 toward the upper side of the Z-axis direction depending on a user's operation. On the input operation surface 110, an image corresponding to a keyboard, GUI (Graphical User Interface), or the like is displayed. Examples of an operation element for performing an operation on the flexible display 11 include a finger, and a pen (stylus pen).

The specific configuration of the flexible display 11 is not particularly limited. For example, as the flexible display 11, a so-called electronic paper, an organic EL (Electro Luminescence) panel, an inorganic EL panel, a liquid crystal panel, or the like can be adopted. In addition, the thickness of the flexible display 11 is not particularly limited, and is about 0.1 mm to 1 mm, for example.

The sensor device 1 includes a metal film (first conductor layer) 12, a conductor layer (second conductor layer) 50, an electrode substrate 20, a first supporting body 30, and a second supporting body 40. The sensor device 1 is disposed on the side of the rear surface 120 of the flexible display 11.

The metal film 12 is configured to have a sheet-like shape and to be deformable. The conductor layer 50 is disposed to face the metal film 12. The electrode substrate 20 includes a plurality of first electrode wires 210 and a plurality of second electrode wires 220, is disposed between the metal film 12 and the conductor layer 50 to be deformable, and is capable of electrostatically detecting the change in the distance between the metal film 12 and the conductor layer 50. The plurality of second electrode wires 220 are disposed to face the plurality of first electrode wires 210 and intersect with the plurality of first electrode wires 210. The first supporting body 30 includes a plurality of first structures 310 and first space portions 330. The plurality of first structures 310 connect the metal film 12 and the electrode substrate 20. The first space portions 330 are formed between the plurality of first structures 310. The second supporting body 40 includes a plurality of second structures 410 and second space portions 430. The respective second structures 410 are disposed between and below adjacent two first structures 310 and connect the conductor layer 50 and the electrode substrate 20. The second space portions 430 are formed between the plurality of second structures 410.

The sensor device 1 (input device 100) according to this embodiment electrostatically detects changes in the distance between the metal film 12 and the electrode substrate 20 and the distance between the conductor layer 50 and the electrode substrate 20 due to an input operation on the input operation surface 110 of the flexible display 11, thereby detecting the input operation. The input operation is not limited to a conscious pressing (pushing) operation on the input operation surface 110, and may be a contact (touching) operation. Specifically, as will be described later, because the input device 100 is capable of detecting even a small pressing force (e.g., about several ten g) applied by a general touching operation, a touching operation can be performed similarly to a general touch sensor.

The input device 100 includes a controller 60, and the controller 60 includes a calculation unit 61 and a signal generating unit 62. The calculation unit 61 detects a user's operation based on the change in capacitance of detection units 20s. The signal generating unit 62 generates an operation signal based on the detection results obtained from the calculation unit 61.

The electronic apparatus 70 shown in FIG. 4 includes a controller 710 that performs processing based on the operation signal generated by the signal generating unit 62 in the input device 100. The operation signal processed by the controller 710 is output to the flexible display 11 as an image signal, for example. The flexible display 11 is connected to a drive circuit mounted on the controller 710 via a flexible wiring substrate 113 (see FIG. 2). The drive circuit may be mounted on the flexible wiring substrate 113.

Examples of the electronic apparatus 70 typically include a mobile phone, a smartphone, a laptop PC (Personal Computer), a tablet PC, and a portable game machine. However, the electronic apparatus 70 is not limited to these portable electronic apparatuses or display apparatuses, and may be applied to a stationary electronic apparatus or display apparatus such as an ATM (Automated Teller Machine) and a ticket vending machine.

In this embodiment, the flexible display 11 is configured as a part of an operation member 10 in the input device 100. Specifically, the input device 100 includes the operation member 10, the electrode substrate 20, the first supporting body 30, the second supporting body 40, and the conductor layer 50. Hereinafter, these elements will be described.

(Operation Member)

The operation member 10 has a laminated structure of the flexible display 11 including the input operation surface 110 and the metal film 12. Specifically, the operation member 10 has the input operation surface 110 and the rear surface 120 opposite to the input operation surface 110, and is configured to have a sheet-like shape and to be deformable. The input operation surface 110 receives a user's operation, and the metal film 12 is formed on the rear surface 120.

The metal film 12 is configured to have a sheet-like shape and to be deformable following the deformation of the flexible display 11, and includes metal foil such as Cu (copper) and Al (aluminum), or a mesh material, for example. The thickness of the metal film 12 is not particularly limited, and may be about several ten nm to several ten micro m, for example. The metal film 12 is connected to a predetermined reference potential (e.g., ground potential). Accordingly, the metal film 12 fulfills a predetermined shielding function against an electromagnetic wave when being mounted on the electronic apparatus 70. Specifically, the metal film 12 prevents an electromagnetic wave from entering from another electronic component mounted on the electronic apparatus 70, and an electromagnetic wave from leaking from the input device 100, for example, thereby contributing to the stability of the operation of the electronic apparatus 70.

As shown in FIG. 3, an adhesive layer 13 on which metal foil is formed is attached to the flexible display 11, thereby forming the metal film 12, for example. The material of the adhesive layer 13 is not particularly limited as long as it has an adhesive property. However, the adhesive layer 13 may be a resin film to which a resin material is applied. Alternatively, the adhesive layer 13 may be configured by a deposition film, a sputtering film, or the like directly formed on the flexible display 11, and may be a coating film such as conductive paste printed on a surface of the flexible display 11.

(Conductor Layer)

The conductor layer 50 forms the lowest portion of the input device 100, and is disposed to face the metal film 12 in the Z-axis direction. The conductor layer 50 functions also as a supporting plate of the input device 100, and is configured to have higher bending rigidity than the operation member 10 and the electrode substrate 20, for example. The conductor layer 50 may be configured by a metal plate including an Al alloy, an Mg (magnesium) alloy, and another metal material, or a conductor plate such as carbon-fiber reinforced plastic. Alternatively, the conductor layer 50 may have a laminated structure in which a plating film, a deposition film, a sputtering film, a conductor film such as metal foil, or the like is formed on an insulating layer including a plastic material. In addition, the thickness of the conductor layer 50 is not particularly limited, and is about 0.3 mm, for example.

The conductor layer 50 is connected to a predetermined reference potential (e.g., ground potential). Accordingly, the conductor layer 50 fulfills a function as an electromagnetic shielding layer when being mounted on the electronic apparatus 70. Specifically, the conductor layer 50 prevents an electromagnetic wave from entering from another electronic component mounted on the electronic apparatus 70, and an electromagnetic wave from leaking from the input device 100, for example, thereby contributing to the stability of the operation of the electronic apparatus 70.

(Electrode Substrate)

The electrode substrate 20 includes a wiring substrate 21 having an almost rectangular planar shape.

The wiring substrate 21 includes the plurality of first electrode wires (X electrodes) 210, the plurality of second electrode wires (Y electrodes) 220 disposed to face the plurality of first electrode wires 210, and a single sheet substrate 211 that supports the plurality of first electrode wires 210 and the plurality of second electrode wires 220. The detection units (capacity sensors) 20s are formed in facing areas between the plurality of second electrode wires 220 and the plurality of first electrode wires 210.

The detection units 20s are arranged in a plane of the electrode substrate 20 in a matrix pattern.

The sheet substrate 211 includes a sheet material having a flexible property, for example, and specifically includes an electrically-insulating plastic sheet (film) such as poly(ethylene terephthalate) (PET), poly(ethylene naphthalate) (PEN), polycarbonate (PC), poly(methyl methacrylate) (PMMA), and polyimide. The thickness of the sheet substrate 211 is not particularly limited, and is several ten micro m to several hundred micro m, for example. As the sheet substrate 211, a substrate obtained by forming an easily-adhesive layer having a thickness of about several 10 nm to several micro m on a surface of a sheet such as PET may be used to obtain an adhesive property at the time of printing or deposition. In addition, a hard coating layer may be applied to the surface of the sheet in order to prevent the surface being damaged.

The sheet substrate 211 has a main body 231 and a projecting portion (tale portion) 232. The main body 231 has an almost rectangular shape, and the projecting portion 232 has the area smaller than that of the main body 231 and has an almost rectangular shape. The sheet substrate 211 is formed by punching processing of a plastic sheet, for example.

The main body 231 supports the plurality of first electrode wires 210 and the plurality of second electrode wires 220. In this embodiment, the main body 231 has a first main surface (front surface) 231a that supports the plurality of first electrode wires 210 and a second main surface (rear surface) 231b that supports the plurality of second electrode wires 220.

Figure 5:
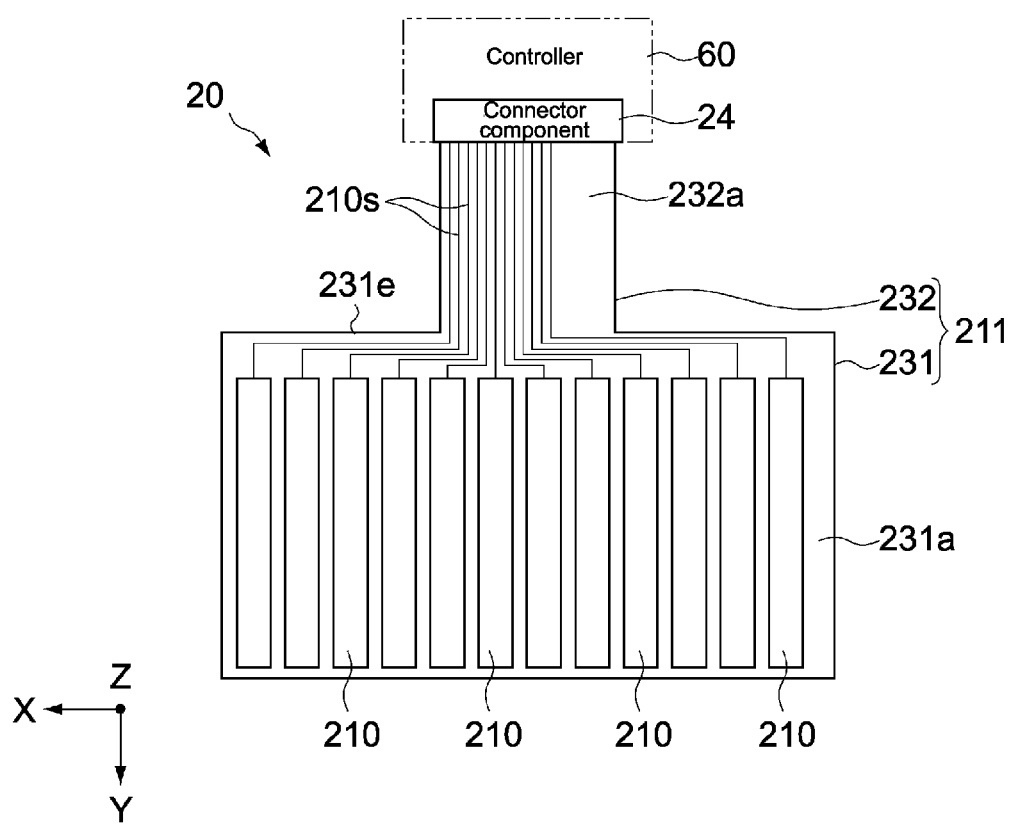
FIG. 5 is a schematic plan view of an electrode substrate in the input device.
Figure 6:
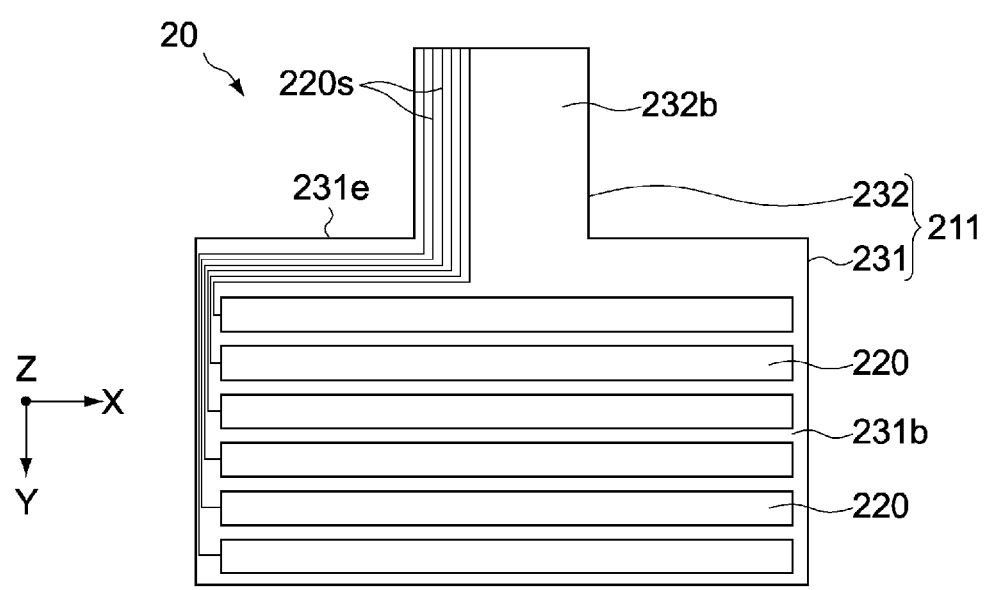
FIG. 6 is a schematic rear view of the electrode substrate.

FIG. 5 is a schematic plan view of the wiring substrate 21 (schematic plan view viewed from the side of the first main surface 231a of the main body 231), and FIG. 6 is a schematic rear view of the wiring substrate 21 (schematic plan view viewed from the side of the second main surface 231b of the main body 231).

As shown in FIG. 5, the plurality of first electrode wires 210 are arranged at a predetermined interval along the X-axis direction, and are substantially linearly formed along the Y-axis direction. On the other hand, as shown in FIG. 6, the plurality of second electrode wires 220 are arranged at a predetermined interval along the Y-axis direction, and are substantially linearly formed along the X-axis direction. It should be noted that the number of the plurality of first electrode wires 210 and the number of the plurality of second electrode wires 220 are not limited to those shown in the figures, and these electrode wires may be formed more densely.

The plurality of first electrode wires 210 and the plurality of second electrode wires 220 may each include a single electrode wire, or may each include an electrode wire group formed of a plurality of fine electrode wires. Alternatively, at least one of: the plurality of first electrode wires 210; and the plurality of second electrode wires 220, may be formed so that each intersection area (facing area) is larger than the other respective area. Specifically, the shapes or forms of the plurality of first electrode wires 210 and the plurality of second electrode wires 220 are not particularly limited, and an appropriate shape may be adopted.

The projecting portion 232 is provided to an edge portion 231e of one long side of the main body 231, and is formed to project outward (in a direction parallel to the Y-axis direction in this example) from the edge portion 231e. Because the projecting portion 232 has a flexible property, the projecting portion 232 is configured to be deformable about the X-axis against the edge portion 231e of the main body 231, for example.

As shown in FIG. 5 and FIG. 6, the projecting portion 232 has a first surface 232a located on the same plane as the first main surface 231a and a second surface 232b located on the same plane as the second main surface 231b. The first surface 232a supports a plurality of first lead wires 210s electrically connected to the plurality of first electrode wires 210, and the second surface 232b supports a plurality of second lead wires 220s electrically connected to the plurality of second electrode wires 220.

The plurality of first lead wires 210s are wiring portions that electrically connect the plurality of first electrode wires 210 and the controller 60, and are formed on the first main surface 231a of the main body 231 and the first surface 232a of the projecting portion 232 to have a predetermined pattern. On the other hand, the plurality of second lead wires 220s are wiring portions that electrically connect the plurality of second electrode wires 220 and the controller 60, and are formed on the second main surface 231b of the main body 231 and the second surface 232b of the projecting portion 232 to have a predetermined pattern.

The electrode substrate 20 further includes a connector component 24. The connector component 24 is mounted on the projecting portion 232. The position on which the connector component 24 is mounted is not particularly limited, and may be appropriately set depending on the type of the connector component 24 or the form of the first lead wires 210s and the second lead wires 220s. The connector component 24 is typically mounted on an end portion of the projecting portion 232.

The connector component 24 is configured to electrically and mechanically connect the electrode substrate 20 and the controller 60. Therefore, the connector component 24 is not necessarily provided to the electrode substrate 20 unlike this embodiment, and may be provided to the controller 60 (circuit substrate constituting the controller 60).

The plurality of first electrode wires 210, the plurality of second electrode wires 220, the plurality of first lead wires 210s, and the plurality of second lead wires 220s may be formed by a printing method such as screen printing, gravure offset printing, and inkjet printing, using conductive paste or the like, or by a patterning method using a photolithography technique with metal foil or a metal layer.

As described above, in the electrode substrate 20 according to this embodiment, the plurality of first electrode wires 210 and the plurality of second electrode wires 220 are disposed to be apart from each other in the thickness direction of the sheet substrate 211 (Z-axis direction). Therefore, in the electrode substrate 20, the detection units (capacity sensors) 20s formed in the facing areas of the plurality of first electrode wires 210 and the plurality of second electrode wires 220 are arranged in a matrix pattern. The detection units 20s are formed in the intersection areas of the plurality of first electrode wires 210 and the plurality of second electrode wires 220.

(Controller)

The controller 60 is electrically connected to the electrode substrate 20. Specifically, the controller 60 is connected to the first electrode wires 210 and the second electrode wires 220 via terminals. The controller 60 constitutes a signal processing circuit that is capable of generating information on the input operation on the input operation surface 110 based on output from the detection units 20s. The controller 60 acquires the amount of change in the capacity of the detection units 20s while scanning the detection units 20s at a predetermined cycle. The controller 60 generates information on the input operation based on the capacity change amount.

The controller 60 is typically formed of a computer including a CPU (Central Processing Unit) or MPU (Microprocessor Unit), and a memory. The controller 60 may include a single chip component, or a plurality of circuit components. The controller 60 may be mounted on the input device 100, or on the electronic apparatus 70 into which the input device 100 is incorporated. In the former case, the controller 60 is mounted on a flexible wiring substrate connected to the electrode substrate 20, for example. In the latter case, the controller 60 may be integrally formed with the controller 710 that controls the electronic apparatus 70.

The controller 60 includes the calculation unit 61 and the signal generating unit 62 as described above, and executes various functions in accordance with a program stored in storage (not shown). The calculation unit 61 calculates the operation position in the XY coordinate system on the input operation surface 110 based on an electrical signal (input signal) output from the first electrode wires 210 and the second electrode wires 220 on the electrode substrate 20. The signal generating unit 62 generates an operation signal based on the calculation results. Accordingly, an image based on an input operation on the input operation surface 110 can be displayed on the flexible display 11.

The calculation unit 61 shown in FIGS. 3 and 4 calculates the XY coordinate pair of the operation position of an operation element on the input operation surface 110 based on output from the respective detection units 20s to which a unique XY coordinate pair is assigned. Specifically, the calculation unit 61 calculates the amount of change in the capacitance in the detection units 20s formed in the intersection areas (facing areas) of the X electrodes (first electrode wires 210) and the Y electrodes (second electrode wires 220) based on the amount of change in the capacitance acquired from the X electrodes and the Y electrodes. With the ratio of the amount of change in the capacitance of the detection units 20s or the like, it is possible to calculate the XY coordinate pair of the operation position of the operation element.

The calculation unit 61 is capable of determining whether or not the input operation surface 110 is operated. Specifically, in the case where the value of the amount of change in the capacitance of the entire detection units 20s or the amount of change in the capacitance of the respective detection units 20s is not less than a predetermined threshold value, for example, it is possible to determine that the input operation surface 110 is operated. In addition, by providing two or more threshold values, it is possible to distinguish a touching operation from a (conscious) pushing operation for performing the determination, for example. Furthermore, it is also possible to calculate a pressing force based on the amount of change in the capacitance of the detection units 20s.

The signal generating unit 62 generates a predetermined operation signal based on the calculation results obtained from the calculation unit 61. The operation signal may be an image control signal for generating a display image to be output to the flexible display 11, an operation signal corresponding to a key in a keyboard image displayed on the operation position on the flexible display 11, or an operation signal related to an operation corresponding to a GUI (Graphical User Interface).

It should be noted that the input device 100 includes the first supporting body 30 and the second supporting body 40 as a configuration in which the distance between the metal film 12 and the electrode substrate 20 (detection units 20s) and the distance between the conductor layer 50 and the electrode substrate 20 are changed by an operation on the input operation surface 110. Hereinafter, the first supporting body 30 and the second supporting body 40 will be described.

(Basic Configuration of First and Second Supporting Body)

The first supporting body 30 is disposed between the operation member 10 and the electrode substrate 20. The first supporting body 30 includes the plurality of first structures 310, a plurality of frame bodies 320, and the first space portions 330. In this embodiment, the first supporting body 30 is joined above the electrode substrate 20 via an adhesive layer 35 (see FIG. 3). The adhesive layer 35 may include an adhesive agent or an adhesive material such as a pressure-sensitive adhesive and a pressure-sensitive tape.

As shown in FIG. 3, the first supporting body 30 according to this embodiment has a laminated structure of a substrate 31, a structure layer 32 provided on a surface (upper surface) of the substrate 31, and a plurality of joining portions 341 formed on a predetermined position on the structure layer 32. The substrate 31 includes an electrically-insulating plastic sheet such as PET, PEN, and PC (polycarbonate). The thickness of the substrate 31 is not particularly limited, and is several micro m to several hundred micro m, for example.

The structure layer 32 includes an electrically-insulating resin material such as UV resin, and forms, on the substrate 31, a plurality of first convex portions 321, a plurality of second convex portions 322, and a plurality of concave portions 323. The plurality of first convex portions 321 each have a shape such as a columnar shape, rectangular column shape, and a frustum shape that projects in the Z-axis direction, and are arranged on the substrate 31 at a predetermined interval, for example. The plurality of second convex portions 322 are formed to surround the substrate 31 and have a predetermined width.

In addition, the structure layer 32 includes a material having enough rigidity to deform the electrode substrate 20 by an input operation on the input operation surface 110. However, the structure layer 32 may include an elastic material that can be deformed together with the operation member 10 at the time of the input operation. Specifically, the modulus of elasticity of the structure layer 32 is not particularly limited, and may be appropriately selected in the range in which desired operation feeling or detection sensitivity is acquired.

The plurality of concave portions 323 are formed to have a flat surface between the plurality of first convex portions 321 and the plurality of second convex portions 322. Specifically, space areas on the plurality of concave portions 323 form the first space portions 330. Moreover, in this embodiment, an adhesion prevention layer 342 (not shown in FIG. 3) including UV resin with a low adhesive property is formed on the plurality of concave portions 323. The shape of the adhesion prevention layer 342 is not particularly limited. The adhesion prevention layer 342 may be formed to have an island shape, or may be formed to be a flat layer on the plurality of concave portions 323.

Furthermore, on the plurality of first convex portions 321 and the plurality of second convex portions 322, the plurality of joining portions 341 including an adhesive resin material or the like are formed. Specifically, the plurality of first structures 310 are formed to have laminated bodies of the plurality of first convex portions 321 and the plurality of joining portions 341 formed thereon, and the frame bodies 320 include laminated bodies of the plurality of second convex portions 322 and the plurality of joining portions 341 formed thereon. Accordingly, the plurality of first structures 310 and the frame bodies 320 are formed to have almost the same thickness (height), e.g., several micro m to several hundred micro m, in this embodiment. It should be noted that the height of the adhesion prevention layer 342 is not particularly limited as long as it is lower than the height of the plurality of first structures 310 and the frame bodies 320, and the adhesion prevention layer 342 is formed to be lower than the plurality of first convex portions 321 and the plurality of second convex portions 322, for example.

The plurality of first structures 310 are disposed to correspond to the arrangement of the detection units 20s. In this embodiment, the plurality of first structures 310 are disposed to face the center of the detection units 20s in the Z-axis direction, for example. However, the plurality of first structures 310 are not limited thereto, and may be disposed on positions offset from the center of the detection units 20s. In addition, the number of first structures 310 that face the respective detection units 20s is not limited to one, and may be two or more.

The frame bodies 320 are formed to surround the first supporting body 30 along the rim of the electrode substrate 20. The length of the frame bodies 320 in a short direction, i.e., width, is not particularly limited as long as the strength of the first supporting body 30 and the entire input device 100 can be sufficiently ensured.

On the other hand, the second supporting body 40 is disposed between the electrode substrate 20 and the conductor layer 50. The second supporting body 40 includes the plurality of second structures 410, second frame bodies 420, and the second space portions 430.

As shown in FIG. 3, in the second supporting body 40 according to this embodiment, the plurality of second structures 410 and the second frame bodies 420 are directly formed on the conductor layer 50. The second supporting body 40 is joined under the electrode substrate 20 via an adhesive layer 36 (see FIG. 3). The adhesive layer 36 may include an adhesive agent or an adhesive material such as a pressure-sensitive adhesive and a pressure-sensitive tape. Alternatively, the adhesive layer 36 may be omitted as necessary.

The plurality of second structures 410 and the second frame bodies 420 include an adhesive insulating resin material, for example, and function also as a joining portion that joins the conductor layer 50 to the electrode substrate 20. The thickness of the plurality of second structures 410 and the second frame bodies 420 is not particularly limited, and is several micro m to several hundred micro m for example.

The respective second structures 410 are disposed between and below adjacent two first structures 310. That is, the respective second structures 410 are disposed between and below adjacent two detection units 20s. However, the plurality of second structures 410 are not limited thereto, and may be disposed to face the detection units 20s.

The second frame bodies 420 are formed to surround the second supporting body 40 along the rim of the conductor layer 50. The width of the second frame bodies 420 is not particularly limited as long as the strength of the second supporting body 40 and the entire input device 100 can be sufficiently ensured. For example, the second frame bodies 420 are formed to have almost the same width as that of the frame bodies 320.

In addition, the modulus of elasticity of the plurality of second structures 410 is not particularly limited similarly to the structure layer 32 constituting the plurality of first structures 310. Specifically, the modulus of elasticity of the plurality of second structures 410 may be appropriately selected in the range in which desired operation feeling or detection sensitivity is acquired, and the plurality of second structures 410 may include an elastic material that can be deformed together with the electrode substrate 20 at the time of the input operation.

The respective second space portions 430 are formed between two second structures 410, and form space areas around the plurality of second structures 410 and the second frame bodies 420. In this embodiment, the second space portions 430 receive the detection units 20s and the plurality of first structures 310 when viewed from the Z-axis direction.

As described above, (1) the first supporting body 30 and the second supporting body 40 according to this embodiment include the first structures 310 and the first space portions 330, and the second structures 410 and the second space portions 430, respectively, and (2) the plurality of first structures 310 and the plurality of second structures 410 are not overlapped when viewed from the Z-axis direction, and the plurality of first structures 310 are arranged on the second space portions 430.

Therefore, as will be described later, it is possible to deform the metal film 12 and the conductor layer 50 also with a small pressing force of about several ten g at the time of operation.

(Behavior of First and Second Supporting Bodies)

Figure 7:
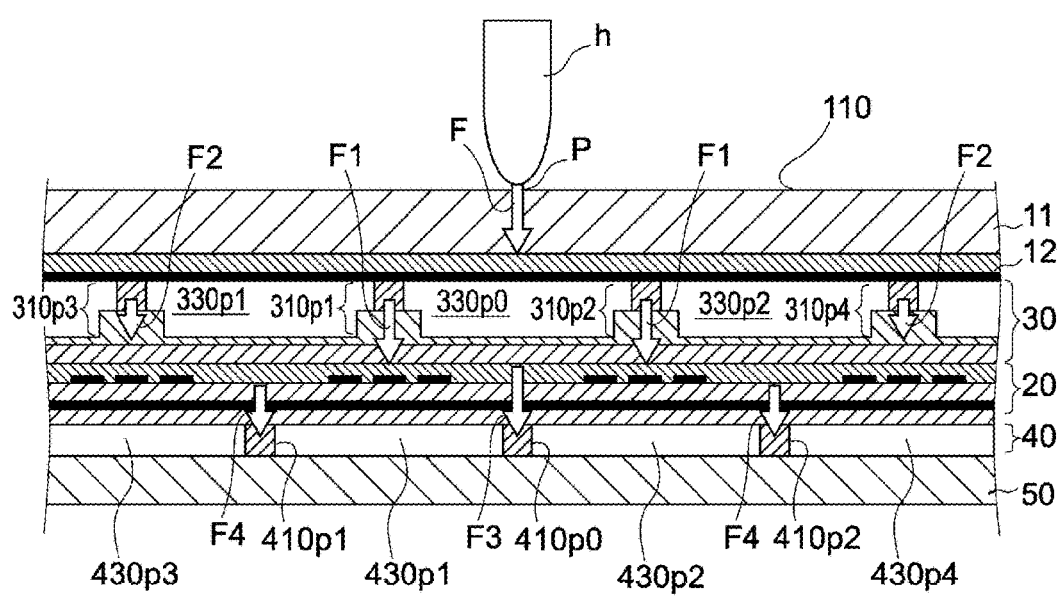
FIG. 7 is a schematic cross-sectional view showing the force applied to first and second structures when a point of a first surface of the input device described above is pressed downward in a Z-axis direction by an operation element.

FIG. 7 is a schematic cross-sectional view showing the force applied to the first structures 310 and the second structures 410 when a point P on the input operation surface 110 is pressed downward in the Z-axis direction by an operation element h. Solid-white arrows in FIG. 7 schematically show the magnitude of the downward force in the Z-axis direction (hereinafter, referred to as simply "downward"). In FIG. 7, the form of the deflection of the metal film 12, the electrode substrate 20, and the like, an elastic deformation of the first structures 310, or the second structures 410 is not shown. It should be noted that in the following description, because a small pressing force is actually applied even if a user performs a touching operation with no conscious pressing, these input operations are collectively referred to as "pressing."

For example, if the point P on first space portion 330p0 is pressed downward with a force F, the metal film 12 located immediately below the point P is deflected downward. Accordingly, first structures 310p1 and 310p2 adjacent to the first space portion 330p0 receive a force F1, and are elastically deformed in the Z-axis direction, thereby reducing the thickness. Moreover, due to the deflection of the metal film 12, a first structure 310p3 adjacent to the first structure 310p1 and a first structure 310p4 adjacent to the first structure 310p2 receive a force F2 smaller than F1. Furthermore, a force is applied to the electrode substrate 20 due to the forces F1 and F2, thereby deflecting mainly areas located immediately below the first structures 310p1 and 310p2 downward. Accordingly, a second structure 410p0 disposed between the first structures 310p1 and 310p2 receives a force F3, and the second structure 410p0 is elastically deformed in the Z-axis direction, thereby reducing the thickness. Moreover, a second structure 410p1 disposed between and below the first structures 310p1 and 310p3 and a second structure 410p2 disposed between and below the first structures 310p2 and 310p4 receive a force F4 smaller than F3.

As described above, it is possible to transmit a force in the thickness direction with the first structures 310 and the second structures 410 and to easily deform the electrode substrate 20. Moreover, the metal film 12 and the electrode substrate 20 are deflected, and an influence of a pressing force is exerted in the in-plane direction (direction parallel to the X-axis direction and the Y-axis direction), thereby exerting an influence of a pressing force not only on the area located immediately below the operation element h but also on the first structures 310 and the second structures 410 in the vicinity thereof.

With regard to (1) above, the metal film 12 and the electrode substrate 20 can be easily deformed with the first space portions 330 and the second space portions 430. Furthermore, it is possible to apply high pressure to the electrode substrate 20 by the pressing force of the operation element h with the first structures 310 and the second structures 410 having a pillar shape or the like, thereby deflecting the electrode substrate 20 efficiently. In this embodiment, because the electrode substrate 20 is formed of the wiring substrate 21 including the single sheet substrate 211, it is possible to enhance the deformability.

Furthermore, with regard to (2) above, because the first structures 310 and the second structures 410 are disposed so as not to be overlapped when viewed from the Z-axis direction, the plurality of first structures 310 easily deflect the electrode substrate 20 via the second space portions 430 located therebelow.

Hereinafter, an exemplary amount of change in the capacitance of the detection units 20s at the time of a specific operation is shown.

(Exemplary Output of Detection Unit)

Figure 8A:
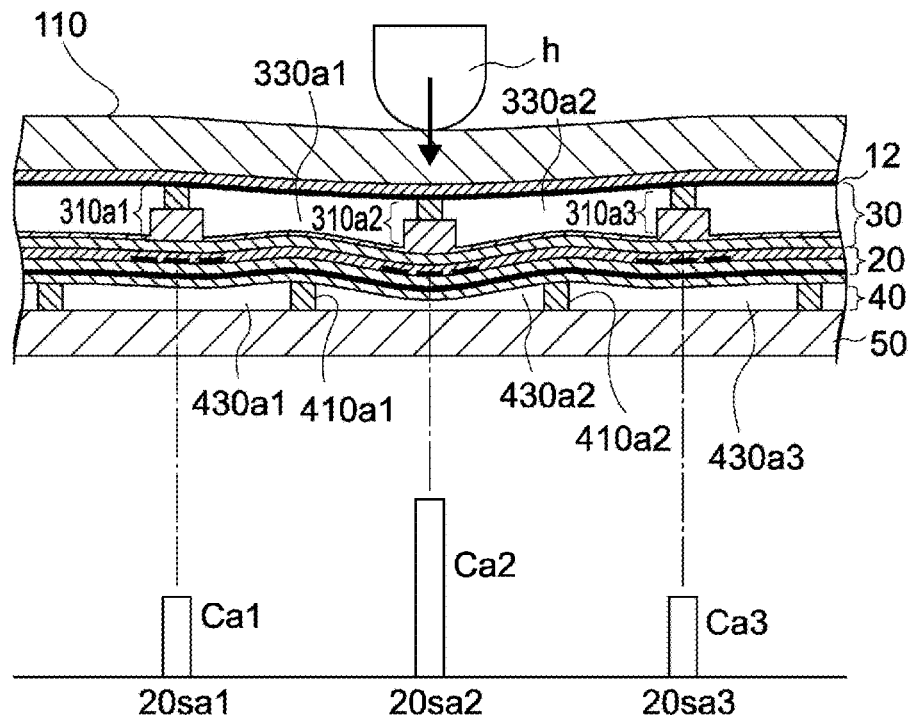
FIG. 8 are each a schematic main portion cross-sectional view showing the state of the input device when a point of the first surface above the first structure is operated by an operation element, and show an exemplary signal output from a detection unit at that time.
Figure 8B:
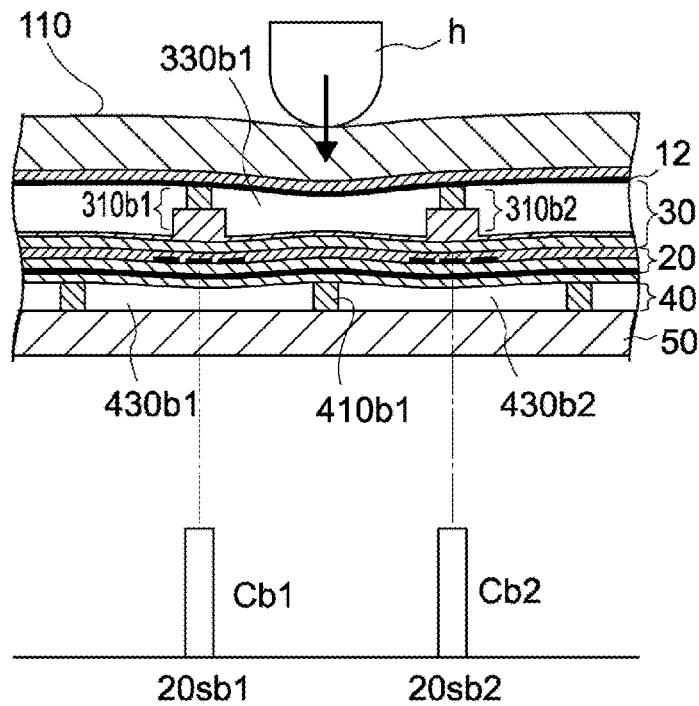

FIGS. 8A and 8B are each a schematic main portion cross-sectional view showing the state of the input device 100 when the input operation surface 110 is operated by the operation element h, and show an exemplary signal output from the detection units 20s at that time. Bar graphs shown along the X-axis in FIGS. 8A and 8B schematically show the amount of change in the capacitance from the reference value in the detection units 20s. In addition, FIG. 8A shows the state where the first structures 310 (310a2) is pressed by the operation element h, and FIG. 8B shows the state where the first space portion 330 (330b1) is pressed by the operation element h.

In FIG. 8A, a force is applied most to the first structure 310a2 located immediately below the operation position and the first structure 310a2 itself is elastically deformed and displaced downward. Due to the displacement, a detection units 20sa2 located immediately below the first structure 310a2 is displaced downward. Accordingly, the detection unit 20sa2 and the conductor layer 50 come close to each other via a second space portion 430a2. Specifically, the distance between the detection unit 20sa2 and the metal film 12 is slightly changed and the distance between the detection unit 20sa2 and the conductor layer 50 is greatly changed. Accordingly, the detection unit 20sa2 acquires an amount of change in the capacitance Ca2. On the other hand, due to an influence of the deflection of the metal film 12, also first structures 310a1 and 310a3 are slightly displaced downward, and the amounts of changes in the capacitances of detection units 20sa1 and 20sa3 are Ca1 and Ca3, respectively.

In the example shown in FIG. 8A, the amount of change in the capacitance Ca2 is the largest, and the amounts of change in the capacitance Ca1 and Ca3 are almost the same and smaller than the amount of change in the capacitance Ca2. Specifically, as shown in FIG. 8A, the amounts of change in the capacitance Ca1, Ca2, and Ca3 show unimodal distribution with the amount of change in the capacitance Ca2 being a vertex. In this case, the calculation unit 61 is capable of calculating the center of gravity or the like based on the ratio of the amounts of change in the capacitance Ca1, Ca2, and Ca3, and calculating the XY coordinate pair on the detection unit 20sa2 as the operation position.

On the other hand, in the case of FIG. 8B, first structures 310b1 and 310b2 in the vicinity of the operation position are elastically deformed slightly and displaced downward due to the deflection of the metal film 12. Due to the displacement, the electrode substrate 20 is deflected, and detection units 20sb1 and 20sb2 located immediately below the first structures 310b1 and 310b2 are displaced downward. Accordingly, the detection units 20sb1 and 20sb2 come close to the conductor layer 50 via second space portions 430b1 and 430b2. Specifically, the distance between the detection units 20sb1 and 20sb2 and the metal film 12 is slightly changed, the distance between the detection units 20sb1 and 20sb2 and the conductor layer 50 is relatively largely changed, and thus amounts of change in the capacitance Cb1 and Cb2 are obtained, respectively.

In the example shown in 8B, the amounts of change in the capacitance Cb1 and Cb2 are almost the same. Accordingly, the calculation unit 61 is capable of calculating the XY coordinate pair between the detection units 20sb1 and 20sb2 as the operation position.

As described above, according to this embodiment, because the thickness between the detection units 20s and the metal film 12 and the thickness between the detection units 20s and the conductor layer 50 are variable by a pressing force, it is possible to make the mount of change in the capacitance in the detection units 20s large. Accordingly, it is possible to improve the detection sensitivity of the input operation.

Moreover, even if the operation position on the flexible display 11 is on any point on the plurality of first structures 310 or the first space portions 330, it is possible to calculate the XY coordinate pair of the operation position. Specifically, because the metal film 12 causes an influence of a pressing force to exert in the in-plane direction, it is possible to change the capacitance of not only the detection units 20s located immediately below the operation position but also the detection units 20s in the vicinity of the operation position when viewed from the Z-axis direction. Accordingly, it is possible to reduce the variety of the detection accuracy in the input operation surface 110 and to maintain high detection accuracy on the entire surface of the input operation surface 110.

On the other hand, in this embodiment, because the electrode substrate 20 has a configuration in which the first electrode wires 210 and the second electrode wires 220 are provided on both surface of the single sheet substrate 211, it is possible to improve the deformation property of the electrode substrate 20 as compared with the case where the electrode substrate 20 includes a laminated body of two wiring substrates that support the electrode wires, for example. Accordingly, it is possible to improve the sensitivity of the detection units 20s and to further improve the detection accuracy.

Figure 9A:
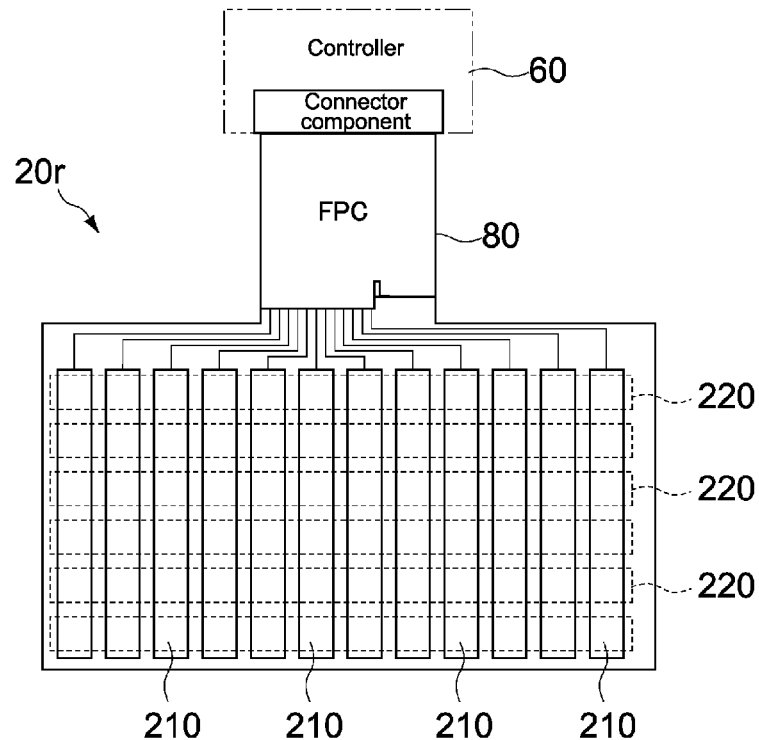
FIG. 9A is a plan view.
Figure 9B:
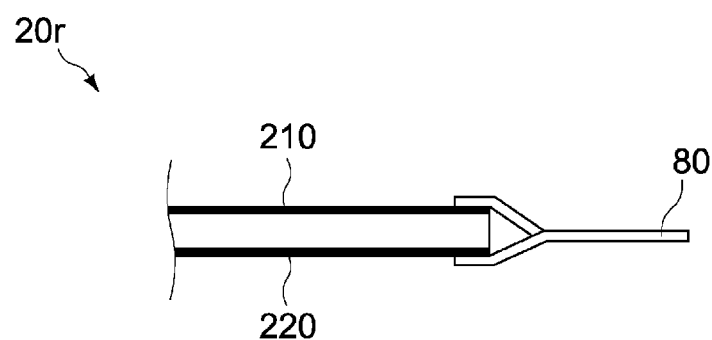
FIG. 9B is a main portion cross-sectional side view.

Moreover, because the sheet substrate 211 forming the electrode substrate 20 integrally has the projecting portion 232 as described above, it is unnecessary to provide a separate wiring substrate (e.g., flexible wiring substrate) 80 that connects the electrode substrate 20 and the controller 60 as shown in FIGS. 9A and 9B, for example. FIG. 9A is a plan view of an electrode substrate 20r according to a comparative example, and FIG. 9B is a main portion cross-sectional side view.

According to this embodiment, because it is possible to reduce the amount of wiring materials and a process of connecting the wiring substrate 80 is unnecessary, it is possible to reduce the cost of manufacturing the electrode substrate 20.

Second Embodiment

Figure 10:
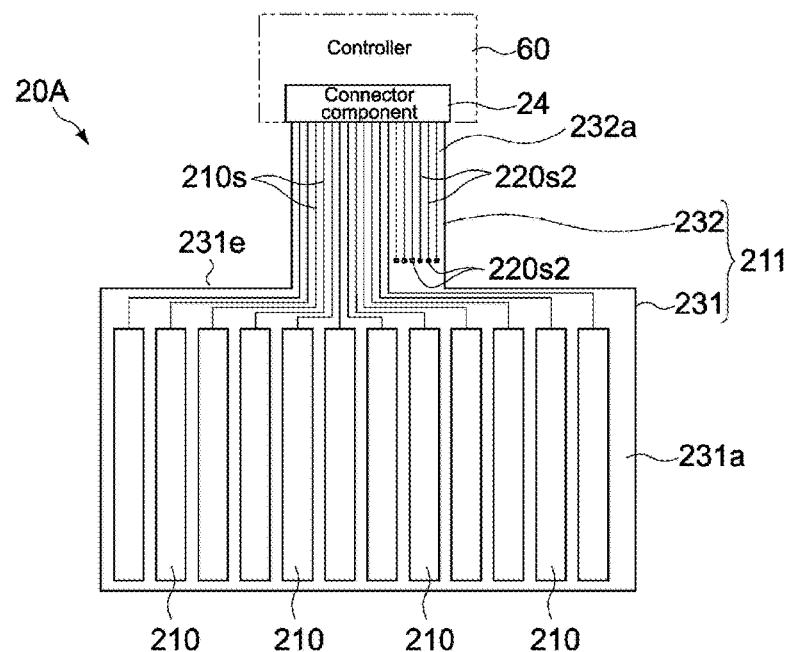
FIG. 10 is a schematic plan view of an electrode substrate in the input device according to the first embodiment of the present disclosure.
Figure 11:
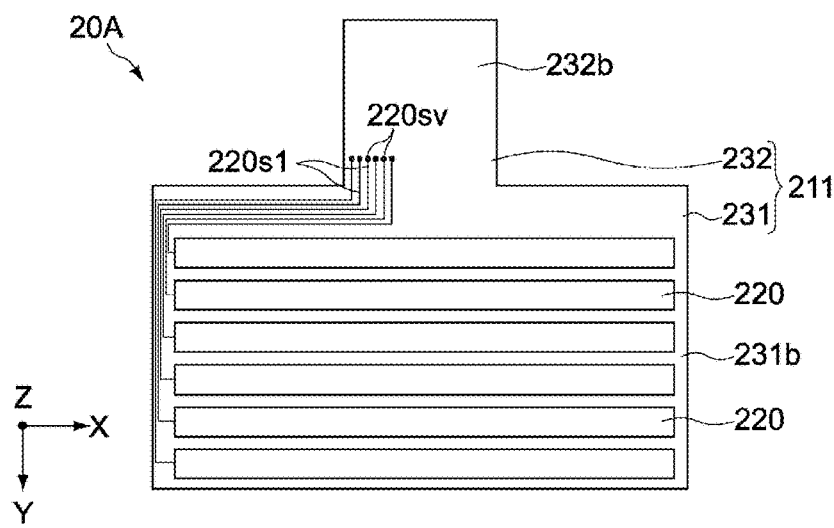
FIG. 11 is a schematic rear view of the electrode substrate.

Next, a second embodiment of the present disclosure will be described. FIG. 10 and FIG. 11 are a plan view and a rear view of the electrode substrate 20 in the input device (sensor device) according to this embodiment, respectively. Hereinafter, configurations that are different from those according to the first embodiment will be mainly described, the same configurations as those according to the embodiment will be denoted by the same reference symbols, and a description thereof will be omitted or simplified.

FIG. 10 is a plan view of an electrode substrate 20A according to this embodiment, and FIG. 11 is a rear view thereof. The electrode substrate 20A according to this embodiment includes the single sheet substrate 211 having the main body 231 and the projecting portion 232 similarly to the first embodiment. Then, the electrode substrate 20A according to this embodiment is different from that in the first embodiment in that the plurality of second lead wires 220s connected to the plurality of second electrode wires 220 are formed from the second surface 232b of the projecting portion 232 to the first surface 232a.

As shown in FIG. 10 and FIG. 11, the plurality of second lead wires 220s include a plurality of first wiring portions 220s1 formed on the second surface 232b of the projecting portion 232, a plurality of second wiring portions 220s2 formed on the first surface 232a of the projecting portion 232, and a plurality of vias 220sv that connect the plurality of first wiring portions 220s1 and the plurality of second wiring portions 220s2 to each other. The plurality of vias 220sv each correspond to an interlayer connection portions that pass through the projecting portion 232, and typically include an embedded via, through-hole plating, or the like.

Also in this embodiment, the same operation and effect as those according the first embodiment can be obtained. In particular, according to this embodiment, because the first lead wires 210s and the second lead wires 220s can be pulled out to the first surface 232a of the projecting portion 232, it is possible to improve the degree of freedom of mounting to the connector component 24 or the controller 60.

Third Embodiment

Next, a third embodiment according to the present disclosure will be described. Hereinafter, configurations that are different from those according to the first embodiment will be mainly described, the same configurations as those according to the embodiments will be denoted by the same reference symbols, and a description thereof will be omitted or simplified.

In the first embodiment, a plurality of first electrode wires and a plurality of second electrode wires are separated from each other in the thickness direction of an electrode substrate, and a plurality of detection units (capacity sensors) are formed in intersection areas of these electrode wires. On the other hand, in this embodiment, a plurality of first electrode wires and a plurality of second electrode wires are separated from each other in the plane of an electrode substrate, and a plurality of detection units (capacity sensors) are formed in facing areas of these electrode wires.

FIG. 12A is a schematic cross-sectional view of an input device 100C according to the second embodiment of the present disclosure, and FIG. 12B is a cross-sectional view showing an enlarged main portion of the input device 100C. This embodiment is different from the first embodiment in that an electrode substrate 20C electrostatically detects the change in the distance between the electrode substrate 20C and the metal film 12 and the distance between the electrode substrate 20C and the conductor layer 50 by the amount of change in the capacitive coupling in the XY plane. Specifically, Y electrodes 220C include facing portions that face X electrodes 210C in the in-plane direction of the electrode substrate 20C, and the facing portions form detection units 20Cs.

The electrode substrate 20C includes a sheet substrate 211C on which the plurality of first electrode wires (X electrodes) 210C and the plurality of second electrode wires (Y electrodes) 220C are disposed, and these plurality of X electrodes 210C and the plurality of Y electrodes 220C are disposed on the same plane (same main surface) of the sheet substrate 211C.

Figure 13A:
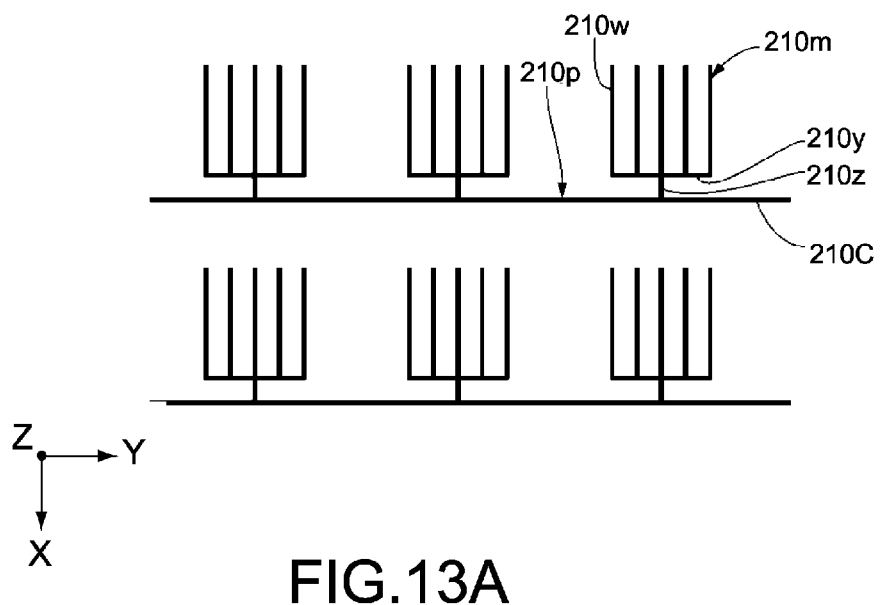
FIG. 13 are each a main portion plan view showing the configuration of first electrode wires and second electrode wires in the input device.
Figure 13B:
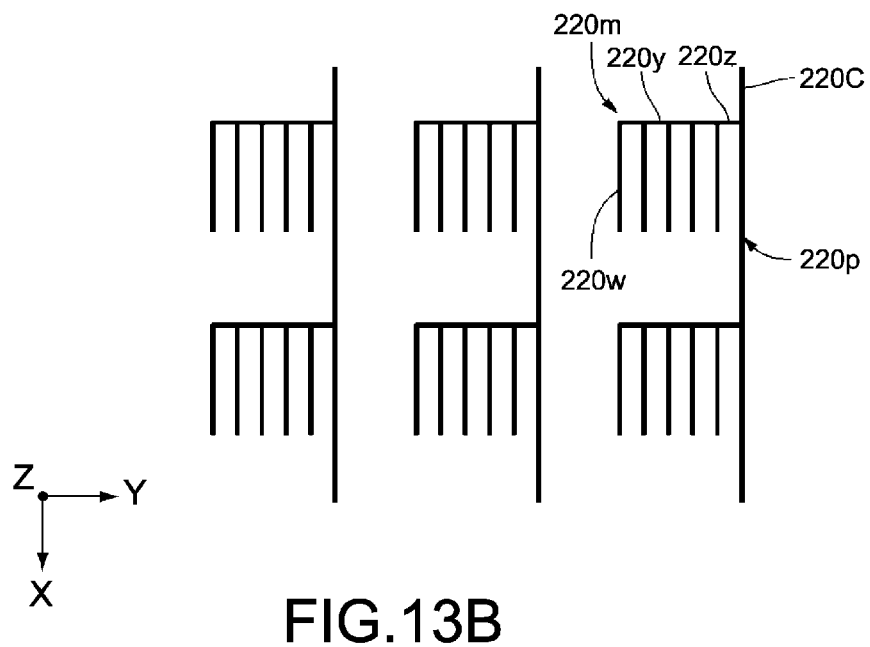

With reference to FIGS. 13A and 13B, the exemplary configuration of the X electrodes (first electrode wires) 210C and the Y electrodes (second electrode wires) 220C will be described. Here, an example in which the respective X electrodes 210C and the respective Y electrodes 220C include a plurality of pectinate unit electrode bodies (first unit electrode bodies) 210m and a plurality of unit electrode bodies (second unit electrode bodies) 220m, and one unit electrode body 210m and one unit electrode body 220m form the respective detection units 20Cs will be described.

As shown in FIG. 13A, the respective X electrodes 210C include the plurality of unit electrode bodies 210m, an electrode wire portion 210p, and a plurality of connection portions 210z. The electrode wire portion 210p extends in the Y-axis direction. The plurality of unit electrode bodies 210m are disposed at predetermined intervals in the Y-axis direction. The electrode wire portion 210p and the unit electrode bodies 210m are arranged at a predetermined interval, and are connected by the connection portions 210z.

As described above, the entire unit electrode bodies 210m have a pectinate shape. Specifically, the unit electrode bodies 210m include a plurality of sub-electrodes 201w and coupling portions 210y. The plurality of sub-electrodes 210w extend in the X-axis direction. Adjacent two sub-electrodes 210w are apart from each other at a predetermined interval. An end of the respective sub-electrodes 210w is connected to the coupling portion 210y extending in the X-axis direction.

As shown in FIG. 13B, the Y electrodes 220C includes the plurality of unit electrode bodies 220m, electrode wire portions 220p, and a plurality of connection portions 220z. The electrode wire portions 220p extend in the X-axis direction. The plurality of unit electrode bodies 220m are disposed at predetermined intervals in the X-axis direction. The electrode wire portions 220p and the unit electrode bodies 220m are disposed to be apart from each other at a predetermined interval, and are connected by the connection portions 220z. It should be noted that it may be possible to employ a configuration in which the connection portions 220z are omitted and the unit electrode bodies 220m are directly provided on the electrode wire portions 220p.

As described above, the entire unit electrode bodies 220m have a pectinate shape. Specifically, the unit electrode bodies 220m include a plurality of sub-electrodes 220w and a coupling portion 220y. The plurality of sub-electrodes 220w extend in the X-axis direction. Adjacent two sub-electrodes 220w are apart from each other at a predetermined interval. An end of the respective sub-electrodes 220w is connected to the coupling portion 220y extending in the Y-axis direction.

Figure 14A:
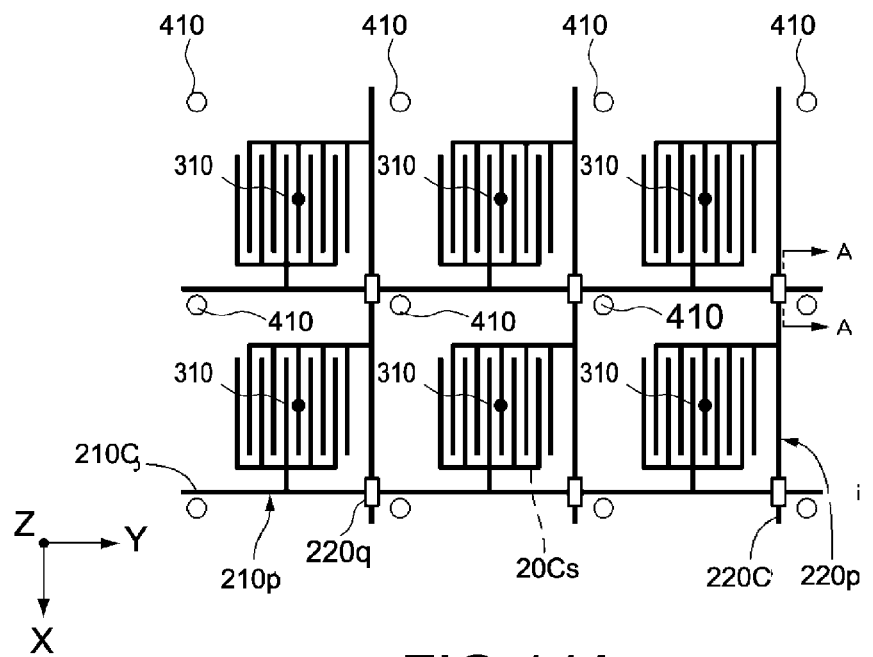
FIG. 14A is a plan view of a main portion of an electrode substrate in the input device.

As shown in FIG. 14A, the detection units 20Cs are formed in areas in which the unit electrode bodies 210m and the unit electrode bodies 220m are combined with each other. The plurality of sub-electrodes 210w of the unit electrode bodies 210m and the plurality of sub-electrodes 220w of the unit electrode bodies 220m are alternately arranged toward the Y-axis direction. Specifically, the sub-electrodes 210w and 220w are arranged to face each other in the in-plane direction of the electrode substrate 20C (e.g., Y-axis direction).

Figure 14B:
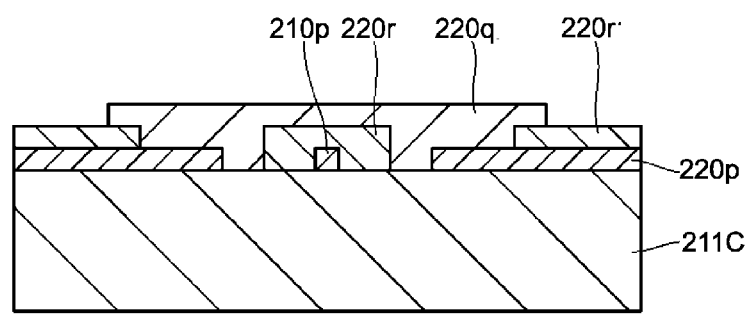
FIG. 14B is a cross-sectional view taken along the line A-A of FIG. 14A.

FIG. 14B is a cross-sectional view when viewed from the A-A direction of FIG. 14A. The Y electrodes 220C are provided to intersect the X electrodes 210C similarly to the first embodiment, but are formed on the same plane (same main surface of the sheet substrate 211C) as that of the X electrodes 210C. In this regard, as shown in FIG. 14B, areas in which the X electrodes 210C and the Y electrodes 220C intersect with each other are formed so that the X electrodes 210C and the Y electrodes 220C are not directly brought into contact with each other. Specifically, on the electrode wire portions 210p of the X electrodes 210C and the electrode wire portions 220p of the Y electrodes 220C, an insulating layer 220r is provided. Then, in an area in which the X electrodes 210C and the Y electrodes 220C intersect with each other, a jumper wiring portion 220q is provided to bridge the insulating layer 220r. The jumper wiring portion 220q connects the electrode wire portions 220p with each other.

Figure 15:
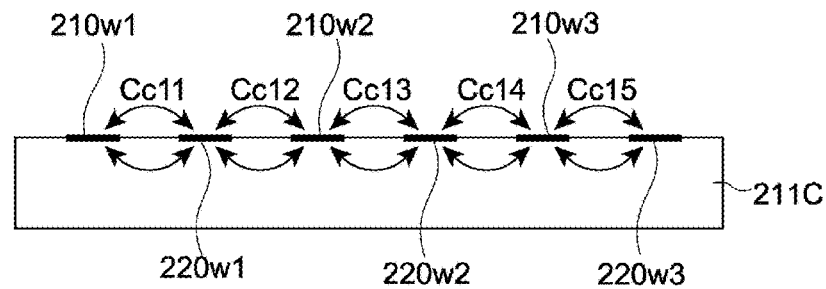
FIG. 15 is a schematic cross-sectional view for explaining the configuration of a detection unit in the input device.

FIG. 15 is a schematic cross-sectional view for explaining the configuration of the detection units 20Cs according to this embodiment. In the example shown in FIG. 15, in the detection units 20Cs, a sub-electrode 210w1 and a sub-electrode 220w1, the sub-electrode 220w1 and 210w2, the sub-electrode 210w2 and a sub-electrode 220w2, the sub-electrode 220w2 and a sub-electrode 210w3, and the sub-electrode 210w3 and a sub-electrode 220w3 are capacitively-coupled, respectively. Specifically, capacitances Cc11, Cc12, Cc13, Cc14, and Cc15 between the respective sub-electrodes are variable depending on the capacitive coupling of the metal film 12 and the conductor layer 50 with the first electrode wires 210C and the second electrode wires 220C including the sub-electrodes with the sheet substrate 211C being as a dielectric layer.

Figure 16:
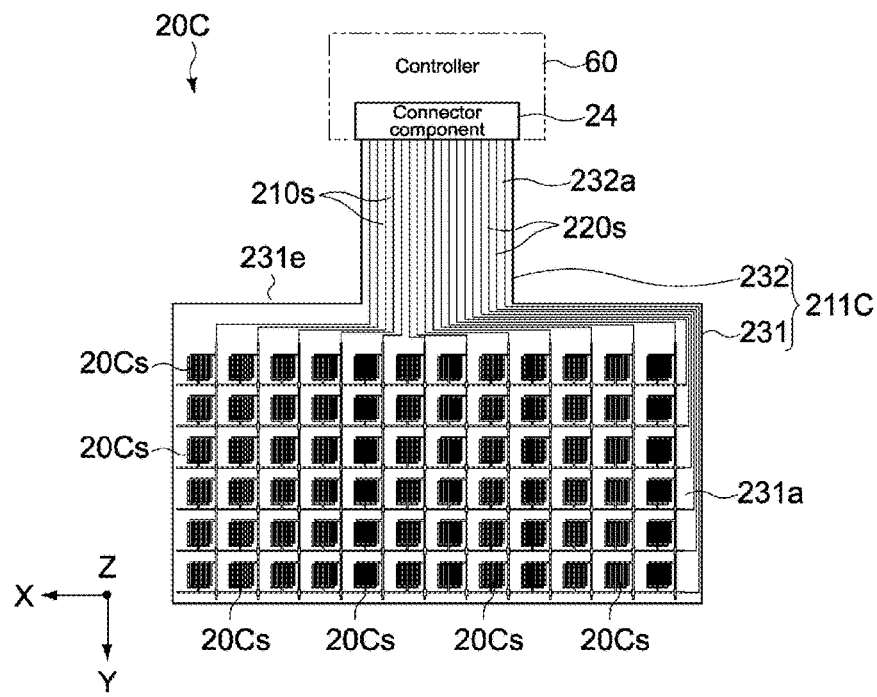
FIG. 16 is a schematic plan view of the electrode substrate.

FIG. 16 is a schematic plan view of the electrode substrate 20C. The sheet substrate 211C has the main body 231 and the projecting portion 232 similarly to the first embodiment, and the projecting portion 232 is formed to project outward from one edge portion 231e of the main body 231.

In this embodiment, the plurality of first electrode wires 210C and the plurality of second electrode wires 220C are formed on the first main surface 231a of the sheet substrate 211C. The plurality of first lead wires 210s connected to the plurality of first electrode wires 210C and the plurality of second lead wires 220s connected to the plurality of second electrode wires 220C are formed on the first main surface 231a of the main body 231 and the first surface 232a of the projecting portion 232, respectively.

According to the configuration, it is possible to obtain the same operation and effect as those in the first embodiment. Moreover, many sub-electrodes are capacitively-coupled, and the distance between the capacitively-coupled sub-electrodes can be narrowed. Accordingly, it is possible to increase the amount of capacitive coupling of the entire input device 100C and to improve the detection sensitivity.

Although embodiments of the present disclosure have been described, the present disclosure is not limited to the embodiments and various modifications can be made without departing from the gist of the present technology.

Figure 17:
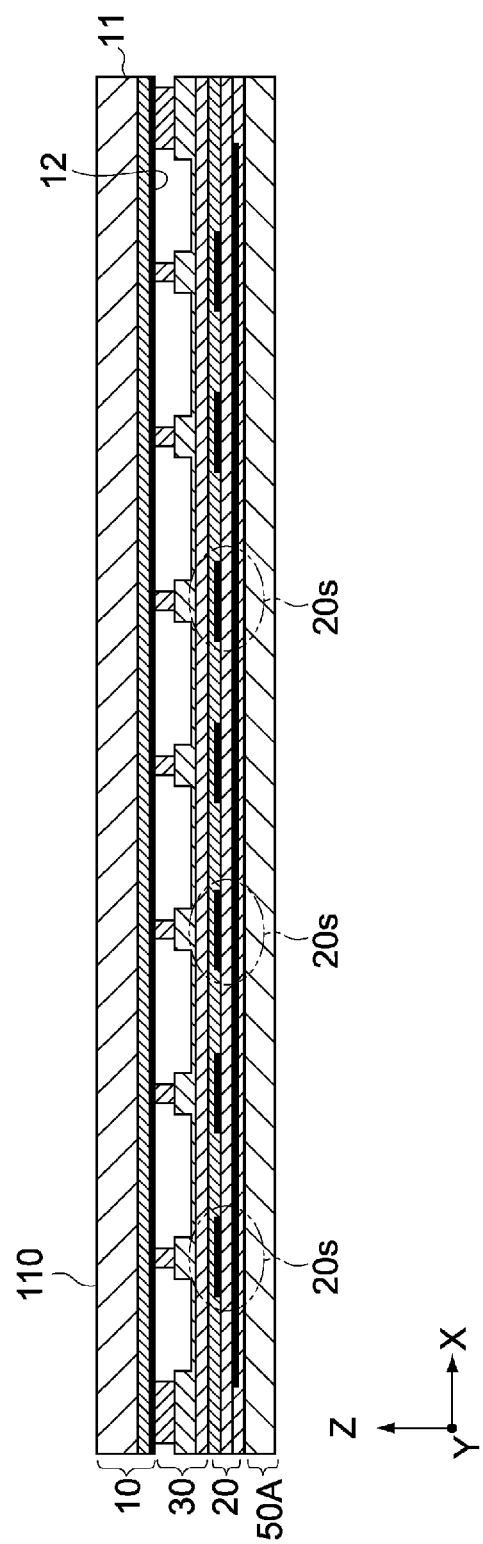
FIG. 17 is a schematic cross-sectional view showing a modified example of the configuration of the input device.

For example, in the embodiments, the configuration in which the pair of supporting bodies 30 and 40 support the electrode substrate 20 has been described. However, only any one of the supporting bodies 30 and 40 may support the electrode substrate 20. FIG. 17 shows the exemplary configuration of the input device in which the second supporting body 40 is omitted, and FIG. 18 shows the exemplary configuration of the input device in which the first supporting body 30 is omitted, respectively.

In the input device shown in FIG. 17, a supporting layer 50A including an insulating material may be used instead of the conductor layer 50. The electrode substrate 20 is fixed to the supporting layer 50A, and the input position and the pressing force are detected based on the change in the distance between the metal film 12 and the detection units 20s at the time of input operation to the input operation surface 110.

Figure 18:
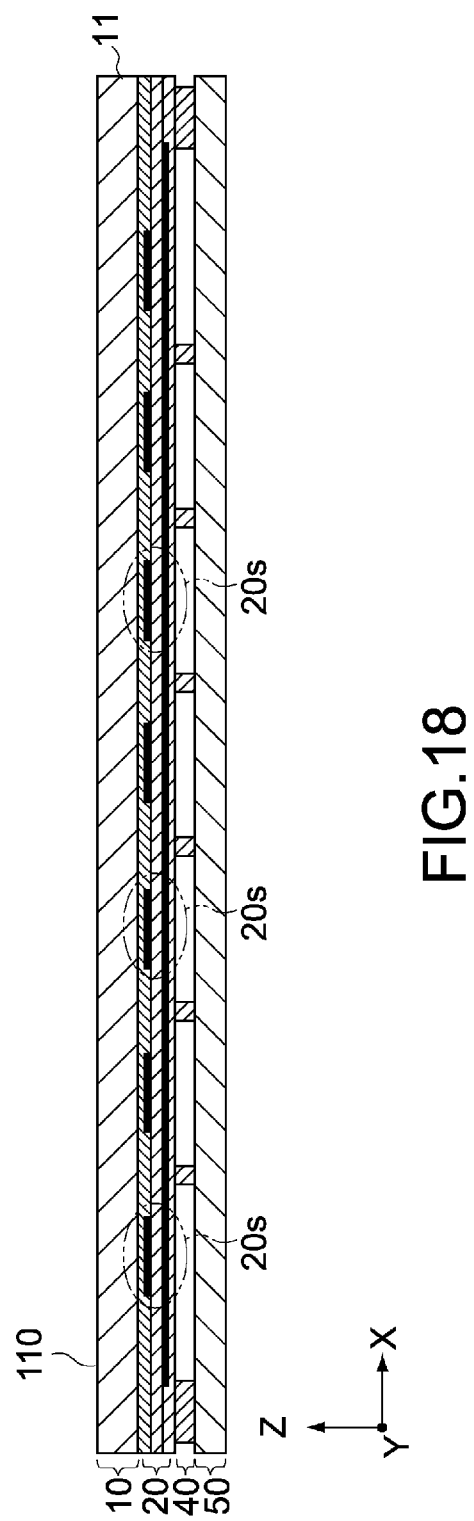
FIG. 18 is a schematic cross-sectional view showing a modified example of the configuration of the input device.

On the other hand, in the input device shown in FIG. 18, the metal film 12 on the side of the operation member 10 may be unnecessary. The electrode substrate 20 is fixed to the operation member 10, and the input position and the pressing force are detected based on the change in the distance between the conductor layer 50 and the detection units 20s at the time of input operation to the input operation surface 110.

It should be noted that the present disclosure may also take the following configurations.

(1) A sensor device including:
a sheet-like first conductor layer that can be deformed;
an electrode substrate including
a plurality of first electrode wires,
a plurality of second electrode wires disposed to face the plurality of first electrode wires, capacity sensors being formed in facing areas between the plurality of second electrode wires and the plurality of first electrode wires, respectively, and a single sheet substrate that supports the plurality of first electrode wires and the plurality of second electrode wires; and a first supporting body including a plurality of first structures that connect the first conductor layer and the electrode substrate.

(2) The sensor device according to (1), in which the sheet substrate has a main body that supports the plurality of first electrode wires and the plurality of second electrode wires, and a projecting portion that is provided on an edge portion of the main body, projects outward from the edge portion, and supports a plurality of first lead wires and a plurality of second lead wires connected to the plurality of first electrode wires and the plurality of second electrode wires, respectively.

(3) The sensor device according to (2), in which the main body has a first main surface that supports the plurality of first electrode wires, and a second main surface that supports the plurality of second electrode wires, and the projecting portion has a first surface that supports the plurality of first lead wires, and a second surface that supports the plurality of second lead wires.

(4) The sensor device according to (3), in which the plurality of second lead wires have a plurality of first wiring portions formed on the second surface, a plurality of second wiring portions formed on the first surface, and a plurality of via portions that connect the plurality of first wiring portions and the plurality of second wiring portions and pass through the projecting portion.

(5) The sensor device according to (2), in which the plurality of first electrode wires and the plurality of second electrode wires are formed on the same main surface of the main body.

(6) The sensor device according to any one of (2) to (5), in which the electrode substrate further includes a connector component mounted on the projecting portion, and the connector component is electrically connected to the plurality of first lead wires and the plurality of second lead wires.

(7) The sensor device according to any one of (1) to (6), further including:

a second conductor layer disposed to face the first conductor layer with the electrode substrate disposed therebetween; and a second supporting body including a plurality of second structures that connect the second conductor layer and the electrode substrate.

Moreover, it should be noted that the present disclosure may also take the following further configurations.

(1) A sensor device comprising:
a sheet-like first conductor layer;
an electrode substrate including
a plurality of first electrode wires,
a plurality of second electrode wires, capacity sensors being formed at paired portions of the first and second electrode wires, and a sheet substrate that supports the first and second electrode wires; and a first supporting body including a plurality of first structures that connect the first conductor layer and the electrode substrate.

(2) The sensor device according to (1), wherein the plurality of second electrode wires are disposed to face the plurality of first electrode wires, and the capacity sensors are formed between the first and second electrode wires in a thickness direction of the sensor device.

(3) The sensor device according to (1), wherein the sheet substrate includes:

a main body that supports the plurality of first electrode wires and the plurality of second electrode wires, and a projecting portion that is integrally formed with and provided on an edge portion of the main body, that projects outward from the edge portion, and that supports a plurality of first lead wires and a plurality of second lead wires connected to the plurality of first electrode wires and the plurality of second electrode wires, respectively.

(4) The sensor device according to (3), wherein the main body includes a first main surface that supports the plurality of first electrode wires, and a second main surface that supports the plurality of second electrode wires, and wherein the projecting portion includes a first surface that supports the plurality of first lead wires, and a second surface that supports the plurality of second lead wires.

(5) The sensor device according to (4), wherein the plurality of second lead wires include:

a plurality of first wiring portions formed on the second surface, a plurality of second wiring portions formed on the first surface, and a plurality of via portions that connect the plurality of first wiring portions and the plurality of second wiring portions and pass through the projecting portion.

(6) The sensor device according to (3), wherein the plurality of first electrode wires and the plurality of second electrode wires are formed on the same main surface of the main body.

(7) The sensor device according to (3), wherein the electrode substrate further includes a connector component mounted on the projecting portion, and wherein the connector component is electrically connected to the plurality of first lead wires and the plurality of second lead wires.

(8) The sensor device according to (1), further comprising:

a second conductor layer disposed to face the first conductor layer with the electrode substrate disposed therebetween; and a second supporting body including a plurality of second structures that connect the second conductor layer and the electrode substrate.

(9) The sensor device according to (1), further comprising a supporting layer that is fixed to the electrode substrate.

(10) The sensor device according to (9), wherein the supporting layer includes an insulating material.

(11) The sensor device according to (9), wherein the capacity sensors detect an input position and a pressing force of an object to be detected based on a change in distance between the sheet-like first metal layer and the capacity sensors.

(12) The sensor device according to (9), wherein the supporting layer is fixed to a first side of the electrode substrate, and the first supporting body is fixed to a second side of the electrode substrate that is opposite to the first side of the electrode substrate.

(13) The sensor device according to (1), further comprising an operation member having an input operation surface, wherein the operation member is fixed to a first side of the electrode substrate and the first supporting body is fixed to a second side of the electrode substrate that is opposed to the first side of the electrode substrate.

(14) The sensor device according to (1), wherein the first and second electrode wires are formed on a same surface of the sheet substrate of the electrode substrate.

(15) The sensor device according to (14), wherein the first electrode wires include a plurality of first unit electrode bodies and the second electrode wires include a plurality of second unit electrode bodies, pairs of the first and second unit electrode bodies forming the respective capacity sensors.

(16) An input device, comprising:
an operating member having an input operation surface;
a sheet-like first conductor layer that supports the operating member;
an electrode substrate including
a plurality of first electrode wires,
a plurality of second electrode wires, capacity sensors being formed at paired portions of the first and second electrode wires, and
a sheet substrate that supports the first and second electrode wires; and
a first supporting body including a plurality of first structures that connect the first conductor layer and the electrode substrate.

(17) An electronic apparatus, comprising:
an display element having an input operation surface;
a sheet-like first conductor layer that supports the display element;
an electrode substrate including
a plurality of first electrode wires,
a plurality of second electrode wires, capacity sensors being formed at paired portions of the first and second electrode wires, and
a sheet substrate that supports the first and second electrode wires; and
a first supporting body including a plurality of first structures that connect the first conductor layer and the electrode substrate.

It should be understood by those skilled in the art that various modifications, combinations, sub-combinations and alterations may occur depending on design re-quirements and other factors insofar as they are within the scope of the appended claims or the equivalents thereof.

REFERENCE SIGNS LIST

1 Sensor Device
10 Operation member
11 Flexible display
12 Conductor layer
20, 20C Electrode substrate
24 Connector component
30 First supporting body
40 Second supporting body
50 Conductor layer
60 Controller
70 Electronic apparatus
100, 100C Input device
210 First electrode wire
210s First lead wire
211, 211C Sheet substrate
220 Second electrode wire
220s Second lead wire
220s1 First wiring portion
220s2 Second wiring portion
220sv Via portion
231 Main body
232 Projecting portion

The invention claimed is:

1. A sensor device comprising:
a sheet-like first conductor layer;
an electrode substrate including
a plurality of first electrode wires,
a plurality of second electrode wires, capacity sensors being formed at paired portions of the first and second electrode wires, and
a sheet substrate that supports the first and second electrode wires; and
a first supporting body including a plurality of first structures that connect the first conductor layer and the electrode substrate;
wherein the sheet substrate includes:
a main body that supports the plurality of first electrode wires and the plurality of second electrode wires, and
a projecting portion, having a first surface and a second surface, that is integrally formed with and provided on an edge portion of the main body, that projects outward from the edge portion, and that supports a plurality of first lead wires on the first surface and a plurality of second lead wires on the second surface, the plurality of first lead wires and the plurality of second lead wires being connected to the plurality of first electrode wires and the plurality of second electrode wires, respectively.

2. The sensor device according to claim 1, wherein the plurality of second electrode wires are disposed to face the plurality of first electrode wires, and the capacity sensors are formed between the first and second electrode wires in a thickness direction of the sensor device.

3. The sensor device according to claim 1,
wherein the main body includes a first main surface that supports the plurality of first electrode wires, and a second main surface that supports the plurality of second electrode wires, and
wherein the projecting portion includes a first surface that supports the plurality of first lead wires, and a second surface that supports the plurality of second lead wires.

4. The sensor device according to claim 3, wherein the plurality of second lead wires include:
a plurality of first wiring portions formed on the second surface,
a plurality of second wiring portions formed on the first surface, and
a plurality of via portions that connect the plurality of first wiring portions and the plurality of second wiring portions and pass through the projecting portion.

5. The sensor device according to claim 1, wherein the plurality of first electrode wires and the plurality of second electrode wires are formed on the same main surface of the main body.

6. The sensor device according to claim 1,
wherein the electrode substrate further includes a connector component mounted on the projecting portion, and
wherein the connector component is electrically connected to the plurality of first lead wires and the plurality of second lead wires.

7. The sensor device according to claim 1, further comprising:
  a second conductor layer disposed to face the first conductor layer with the electrode substrate disposed therebetween; and
  a second supporting body including a plurality of second structures that connect the second conductor layer and the electrode substrate.

8. The sensor device according to claim 1, further comprising a supporting layer that is fixed to the electrode substrate.

9. The sensor device according to claim 8, wherein the supporting layer includes an insulating material.

10. The sensor device according to claim 8, wherein the capacity sensors detect an input position and a pressing force of an object to be detected based on a change in distance between the sheet-like first metal layer and the capacity sensors.

11. The sensor device according to claim 8, wherein the supporting layer is fixed to a first side of the electrode substrate, and the first supporting body is fixed to a second side of the electrode substrate that is opposite to the first side of the electrode substrate.

12. The sensor device according to claim 1, further comprising an operation member having an input operation surface, wherein the operation member is fixed to a first side of the electrode substrate and the first supporting body is fixed to a second side of the electrode substrate that is opposed to the first side of the electrode substrate.

13. The sensor device according to claim 1, wherein the first and second electrode wires are formed on a same surface of the sheet substrate of the electrode substrate.

14. The sensor device according to claim 13, wherein the first electrode wires include a plurality of first unit electrode bodies and the second electrode wires include a plurality of second unit electrode bodies, pairs of the first and second unit electrode bodies forming the respective capacity sensors.

15. An input device, comprising:
  an operating member having an input operation surface;
  a sheet-like first conductor layer that supports the operating member;
  an electrode substrate including
    a plurality of first electrode wires,
    a plurality of second electrode wires, capacity sensors being formed at paired portions of the first and second electrode wires, and
    a sheet substrate that supports the first and second electrode wires; and
  a first supporting body including a plurality of first structures that connect the first conductor layer and the electrode substrate;
  wherein the sheet substrate includes:
  a main body that supports the plurality of first electrode wires and the plurality of second electrode wires, and
  a projecting portion, having a first surface and a second surface, that is integrally formed with and provided on an edge portion of the main body, that projects outward from the edge portion, and that supports a plurality of first lead wires on the first surface and a plurality of second lead wires on the second surface, the plurality of first lead wires and the plurality of second lead wires being connected to the plurality of first electrode wires and the plurality of second electrode wires, respectively.

16. An electronic apparatus, comprising:
  a display element having an input operation surface;
  a sheet-like first conductor layer that supports the display element;
  an electrode substrate including
    a plurality of first electrode wires,
    a plurality of second electrode wires, capacity sensors being formed at paired portions of the first and second electrode wires, and
    a sheet substrate that supports the first and second electrode wires; and
  a first supporting body including a plurality of first structures that connect the first conductor layer and the electrode substrate;
  wherein the sheet substrate includes:
  a main body that supports the plurality of first electrode wires and the plurality of second electrode wires, and
  a projecting portion, having a first surface and a second surface, that is integrally formed with and provided on an edge portion of the main body, that projects outward from the edge portion, and that supports a plurality of first lead wires on the first surface and a plurality of second lead wires on the second surface, the plurality of first lead wires and the plurality of second lead wires being connected to the plurality of first electrode wires and the plurality of second electrode wires, respectively.

* * * * *